(12) United States Patent
Sakaguchi et al.

(10) Patent No.: US 10,704,394 B2
(45) Date of Patent: Jul. 7, 2020

(54) FLOW PASSAGE FORMING PLATE, FLOW PASSAGE FORMING MEMBER ASSEMBLY AND VANE INCLUDING THE SAME, GAS TURBINE, MANUFACTURING METHOD OF FLOW PASSAGE FORMING PLATE, AND MODIFICATION METHOD OF FLOW PASSAGE FORMING PLATE

(71) Applicant: Mitsubishi Hitachi Power Systems, Ltd., Kanagawa (JP)

(72) Inventors: Tadakazu Sakaguchi, Kanagawa (JP); Hiroshi Shimizu, Kanagawa (JP); Shinji Yoshida, Kanagawa (JP); Yoshio Fukui, Kanagawa (JP); Masamitsu Kuwabara, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 231 days.

(21) Appl. No.: 15/778,522

(22) PCT Filed: Nov. 17, 2016

(86) PCT No.: PCT/JP2016/084080
§ 371 (c)(1),
(2) Date: May 23, 2018

(87) PCT Pub. No.: WO2017/090502
PCT Pub. Date: Jun. 1, 2017

(65) Prior Publication Data
US 2018/0347369 A1    Dec. 6, 2018

(30) Foreign Application Priority Data

Nov. 27, 2015 (JP) .................................. 2015-232100

(51) Int. Cl.
*F01D 5/18* (2006.01)
*F01D 25/14* (2006.01)
(Continued)

(52) U.S. Cl.
CPC ................. *F01D 5/18* (2013.01); *F01D 9/02* (2013.01); *F01D 25/14* (2013.01); *F02C 3/04* (2013.01);
(Continued)

(58) Field of Classification Search
CPC ... F01D 5/18; F01D 9/02; F01D 9/023; F01D 25/14; F02C 7/12; F02C 3/04; F05D 2260/201; F05D 2900/03044
See application file for complete search history.

(56) References Cited

U.S. PATENT DOCUMENTS 3,628,880 A * 12/1971 Smuland .................. F01D 5/189
                                                    415/175
4,693,667 A    9/1987 Lenz et al.
(Continued)

FOREIGN PATENT DOCUMENTS

EP    2 282 012    2/2011
JP    09-228802    9/1997
(Continued)

OTHER PUBLICATIONS

International Search Report dated Jan. 31, 2017 in International (PCT) Application No. PCT/JP2016/084080.
(Continued)

*Primary Examiner* — Carlos A Rivera
(74) *Attorney, Agent, or Firm* — Wenderoth, Lind & Ponack, L.L.P.

(57) ABSTRACT

A flow passage forming plate includes a plate main body, a peripheral wall, and a ledge. The plate main body has a gas path surface facing a side of a gas flow passage, and an inner
(Continued)

surface facing the opposite side from the gas path surface. The peripheral wall protrudes along a peripheral edge of the plate main body, from the inner surface toward an opposite-flow-passage side. The ledge protrudes along an inner wall surface of the peripheral wall, from the inner surface toward the opposite-flow-passage side. The ledge receives an impingement plate having a plurality of through-holes. The ledge is disposed only in a part of an inner wall surface of the peripheral wall.

19 Claims, 16 Drawing Sheets

(51) Int. Cl.
  *F01D 9/02* (2006.01)
  *F02C 3/04* (2006.01)
  *F02C 7/12* (2006.01)
(52) U.S. Cl.
  CPC ............ *F02C 7/12* (2013.01); *F05D 2220/32* (2013.01); *F05D 2230/21* (2013.01); *F05D 2260/201* (2013.01)

(56) References Cited

U.S. PATENT DOCUMENTS

| | | | |
|---|---|---|---|
| 5,634,766 A * | 6/1997 | Cunha | ............... F01D 5/187 415/115 |
| 8,517,667 B1 | 8/2013 | Liang | |
| 2002/0098079 A1 * | 7/2002 | Fujikawa | ................ F01D 9/00 415/116 |
| 2007/0201979 A1 | 8/2007 | Veltre et al. | |
| 2010/0129196 A1 | 5/2010 | Johnston et al. | |
| 2013/0051972 A1 * | 2/2013 | Romanov | ............... F01D 11/24 415/1 |
| 2016/0023275 A1 * | 1/2016 | Propheter-Hinckley | .................... B22F 3/1055 416/96 A |
| 2016/0201472 A1 * | 7/2016 | Okajima | .................. F01D 9/02 415/177 |
| 2017/0292407 A1 * | 10/2017 | Moga | ....................... F01D 5/187 |

FOREIGN PATENT DOCUMENTS

| | | |
|---|---|---|
| JP | 09-228803 | 9/1997 |
| JP | 2003-083001 | 3/2003 |
| JP | 2007-224919 | 9/2007 |
| JP | 5676040 | 2/2015 |

OTHER PUBLICATIONS

Written Opinion of the International Searching Authority dated Jan. 31, 2017 in International (PCT) Application No. PCT/JP2016/084080.

* cited by examiner

FIG. 18
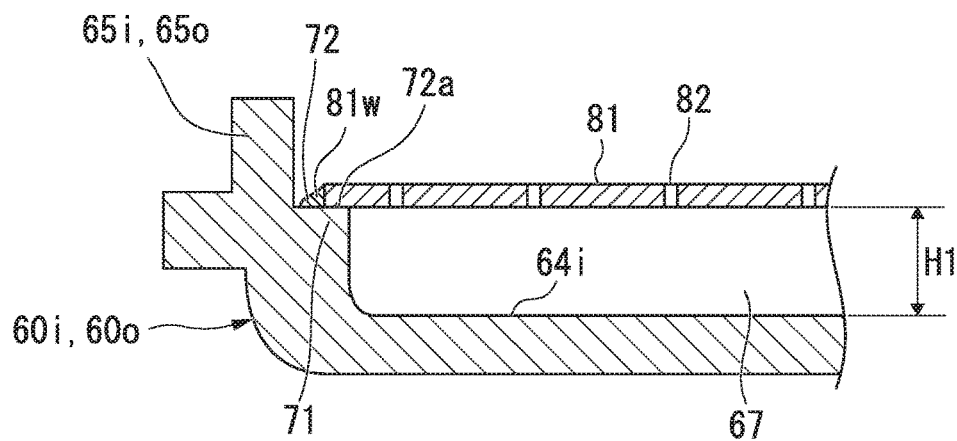
(A)
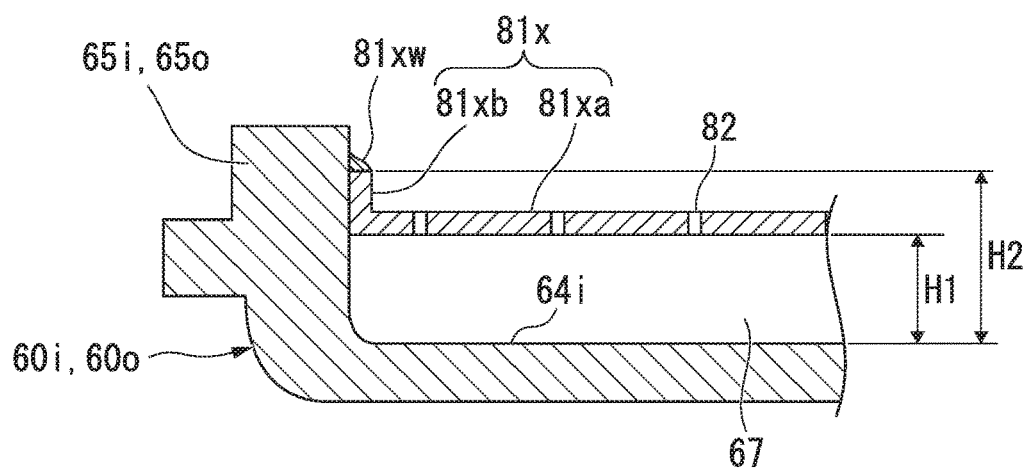
(B)
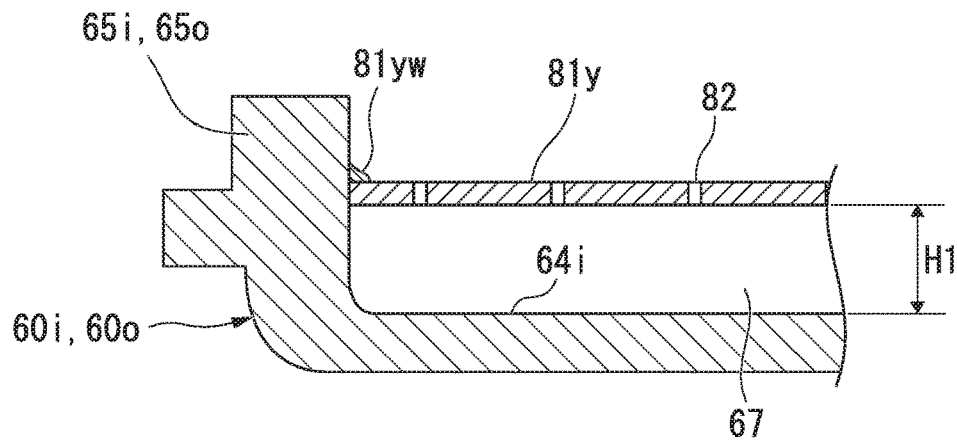
(C)

FLOW PASSAGE FORMING PLATE, FLOW PASSAGE FORMING MEMBER ASSEMBLY AND VANE INCLUDING THE SAME, GAS TURBINE, MANUFACTURING METHOD OF FLOW PASSAGE FORMING PLATE, AND MODIFICATION METHOD OF FLOW PASSAGE FORMING PLATE

TECHNICAL FIELD

The present invention relates to a flow passage forming plate that defines a part of a gas flow passage through which combustion gas flows in a gas turbine, a flow passage forming member assembly and a vane including this flow passage forming plate, a gas turbine, a manufacturing method of a flow passage forming plate, and a modification method of a flow passage forming plate.

The present application claims priority based on Japanese Patent Application No. 2015-232100 filed on Nov. 27, 2015, the contents of which are incorporated herein by reference.

BACKGROUND ART

A gas turbine includes a compressor that generates compressed air by compressing atmospheric air, a combustor that generates combustion gas by combusting fuel in the compressed air, and a turbine that is driven by the combustion gas. The turbine has a turbine rotor that rotates around an axis, a plurality of vane rows that are arrayed in an axial direction in which the axis extends, and a turbine casing that rotatably covers the turbine rotor. The turbine rotor has a rotor shaft that extends in the axial direction around the axis, and a plurality of blade rows that are fixed to the rotor shaft. The plurality of blade rows each have a plurality of blades that are arrayed in a circumferential direction around the axis. One vane row of the plurality of vane rows is disposed on the upstream side of each of the plurality of blade rows. The plurality of vane rows each have a plurality of vanes that are arrayed in the circumferential direction around the axis.

The blade has a blade body extending in a radial direction, and a platform provided on the radially inner side of the blade body. The vane has a vane body extending in the radial direction, an inner shroud provided on the radially inner side of the vane body, and an outer shroud provided on the radially outer side of the vane body. Each of the platform of the blade and the inner shroud and the outer shroud of the vane is a flow passage forming plate that defines a part of a gas flow passage through which combustion gas flows. In addition, ring segments that constitute a part of the turbine casing and are disposed on the radially outer side of the blades are also flow passage forming plates that define a part of the gas flow passage.

Each of these flow passage forming plates is exposed to high-temperature combustion gas, and therefore needs to be cooled with cooling air, for example.

For example, Patent Literature 1 below discloses a technique of cooling the inner shroud of a vane, which is a flow passage forming plate, with cooing air from the radially inner side of the inner shroud. This inner shroud has a shroud plate main body and a peripheral wall that is provided along a peripheral edge of the shroud plate main body. The shroud plate main body has a gas path surface facing the side of a gas flow passage through which combustion gas flows, and an inner surface facing the opposite side from the gas path surface. The peripheral wall protrudes toward the radially inner side relative to the inner surface of the shroud plate main body. This inner shroud has an impingement plate provided inside a region surrounded by the peripheral wall, at a position, separated from the inner surface of the shroud plate main body toward the radially inner side. This impingement plate has a plurality of through-holes. This impingement plate is supported by a ledge that protrudes along an inner wall surface of the peripheral wall, from the inner surface of the shroud plate main body toward the radially inner side.

Cooling air is blown out of the plurality of through-holes of the impingement plate toward the inner surface of the shroud plate main body. Thus, the shroud plate main body having the gas path surface is impingement-cooled by this cooling air.

CITATION LIST

Patent Literature

Patent Literature 1: Japanese Patent No. 5676040

SUMMARY OF INVENTION

Technical Problem

In recent years, the temperature of combustion gas has been raised to enhance the output efficiency of a gas turbine. Accordingly, it is desired that the cooling effect of cooling air on flow passage forming plates be enhanced.

Therefore, an object of the present invention is to provide a technique that can enhance the cooling effect of cooling air on flow passage forming plates.

Solution to Problem

A flow passage forming plate of a first aspect according to the present invention to achieve the above object is a flow passage forming plate that defines a part of a gas flow passage through which combustion gas flows in a gas turbine, the flow passage forming plate including:

a plate main body having a gas path surface that faces the side of the gas flow passage, and an inner surface that faces the opposite side from the gas path surface;

a peripheral wall that is provided along a peripheral edge of the plate main body, and protrudes, relative to the inner surface, toward an opposite-flow-passage side that is the side of the inner surface based on the gas path surface; and a ledge that protrudes along an inner wall surface of the peripheral wall, from the inner surface toward the opposite-flow-passage side, and receives an impingement plate having a plurality of through-holes, wherein the flow passage forming plate has the ledge only in a part of the inner wall surface of the peripheral wall in a wall extension direction in which the peripheral wall extends.

The ledge of the flow passage forming plate that receives the impingement plate is formed not along the entire inner wall surface of the peripheral wall but along only a part of the inner wall surface of the peripheral wall. Thus, in this flow passage forming plate, the ledge is not provided in a part of the inner wall surface of the peripheral wall. In this flow passage forming plate, therefore, the through-holes of the impingement plate can be formed close to the inner wall surface of the peripheral wall so that the inner wall surface of the peripheral wall, and moreover a part of the inner surface of the plate main body that is close to the inner wall surface of the peripheral wall can be effectively cooled with cooling air flowing through these through-holes into an inner cavity between the plate main body and the impingement plate. As a result, an outer wall surface of the peripheral wall, and moreover a part of the gas path surface that extends along the peripheral wall can be effectively cooled. Moreover, in the part where the ledge is not provided, the wall between the inner cavity and an outer space on the opposite side based on that part has a smaller thickness, so that, compared with the part where the ledge is provided, cooling of the plate main body having the gas path surface is promoted and the temperature of the gas path surface can be reduced. In this respect, too, the cooling effect on this flow passage forming plate can be enhanced.

A flow passage forming plate of a second aspect according to the present invention to achieve the above object is the flow passage forming plate of the first aspect, wherein the ledge includes a first ledge and a second ledge that are separated from each other in the wall extension direction.

A flow passage forming member assembly of a third aspect according to the present invention to achieve the above object includes: the flow passage forming plate of the first or second aspect; the impingement plate that is supported on the ledge of the flow passage forming plate; and a welded part that connects the flow passage forming plate and the impingement plate to each other.

A vane of a fourth aspect according to the present invention to achieve the above object includes the flow passage forming member assembly of the third aspect, and a vane body that has an airfoil shape and extends from the gas path surface of the flow passage forming plate toward the flow passage side opposite from the opposite-flow-passage side, wherein the plate main body has a front end surface that is an end surface on the side of a leading edge of the vane body relative to a trailing edge of the vane body, a back end surface that faces the opposite side from the front end surface, a pressure-side end surface that is an end surface on the side of a pressure-side surface of the vane body relative to a suction-side surface of the vane body, and a suction-side end surface that faces the opposite side from the pressure-side end surface.

A vane of a fifth aspect according to the present invention to achieve the above object is the vane of the fourth aspect, including a front wall that is a part of the peripheral wall and provided along the front end surface of the plate main body, wherein the ledge includes a first front ledge and a second front ledge that extend along the front wall and are separated from each other in a front wall extension direction in which the front wall extends, and the leading edge of the vane body is located between the first front ledge and the second front ledge in the front wall extension direction.

As high-temperature combustion gas hits the leading edge of the vane body of a vane, a horseshoe vortex flow of the combustion gas occurs in the vicinity of the leading edge. As a result, the coefficient of heat transfer between the combustion gas forming the horseshoe vortex flow, and a surface of the leading edge of the vane body and a surface of the shroud and a surface of a fillet in the vicinity of this leading edge increases. Thus, a part of the vane body in the vicinity of the leading edge is more easily heated by the combustion gas than the pressure-side surface or the suction-side surface of the vane body. A region of the gas path surface of the plate main body in the vicinity of the leading edge of the vane body is also easily heated by the combustion gas. Moreover, the distance between the leading edge of the vane body and an inner peripheral surface of the front wall in a direction from the leading edge toward the trailing edge of the vane body is short. Accordingly, it is difficult to provide the through-holes of the impingement plate in this space, and it is difficult to cool this space with cooling air. In the above vane, however, the front ledge is not provided in the region in which the leading edge of the vane body is located in the front wall extension direction in which the front wall extends. Thus, the region of the flow passage forming plate that is easily heated and not easily cooled can be cooled in this vane.

A vane of a sixth aspect according to the present invention to achieve the above object is the vane of the fourth or fifth aspect, including a suction-side wall that is a part of the peripheral wall and provided along the suction-side end surface of the plate main body, wherein the ledge includes a first suction-side ledge and a second suction-side ledge that extend along the suction-side wall and are separated from each other in a suction-side wall extension direction in which the suction-side wall extends, and a part of the suction-side surface of the vane body that is closest to the suction-side end surface of the plate main body is located between the first suction-side ledge and the second suction-side ledge in the suction-side wall extension direction.

The distance between the part of the suction-side surface of the vane body that is closest to the suction-side end surface of the plate main body and an inner wall surface of the suction-side wall is short. Accordingly, it is difficult to provide the through-holes of the impingement plate in this space, and it is difficult to cool this space with cooling air. In the above vane, however, the suction-side ledge is not provided in the part of the suction-side surface of the vane body that is closest to the suction-side end surface of the plate main body in the suction-side wall extension direction in which the suction-side wall extends. Thus, the region of the flow passage forming plate that is not easily cooled can be cooled in this vane.

A gas turbine of a seventh aspect according to the present invention to achieve the above object includes the flow passage forming member assembly of the third aspect, and a combustor that generates the combustion gas by combusting fuel.

A gas turbine of an eighth aspect according to the present invention to achieve the above object includes the vane of any one of the fourth to sixth aspects, and a combustor that generates the combustion gas by combusting fuel.

A manufacturing method of a flow passage forming plate of a ninth aspect according to the present invention to achieve the above object is a manufacturing method of a flow passage forming plate that defines a part of a gas flow passage through which combustion gas flows in a gas turbine, the manufacturing method including:

an intermediate product forming step of forming an intermediate product of the flow passage forming plate by casting; and a part removing step of removing a part of the intermediate product, wherein the intermediate product created in the intermediate product forming step has:
  a plate main body having a gas path surface that faces the side of the gas flow passage, and an inner surface that faces the opposite side from the gas path surface;
  a peripheral wall that is provided along a peripheral edge of the plate main body, and protrudes, relative to the inner surface, toward an opposite-flow-passage side that is the side of the inner surface based on the gas path surface; and
  a ledge that protrudes along an inner wall surface of the peripheral wall, from the inner surface toward the opposite-flow-passage side, and receives an impingement plate having a plurality of through-holes, and in the part removing step, a part of the ledge in a wall extension direction in which the peripheral wall extends is removed.

A manufacturing method of a flow passage forming plate of a tenth aspect according to the present invention to achieve the above object is the manufacturing method of the ninth aspect, wherein, in the part removing step, a part of the plate main body on the side of the inner surface is removed so as to reduce the interval between the gas path surface and the inner surface of the plate main body.

A modification method of a flow passage forming plate of an eleventh aspect according to the present invention to achieve the above object is a modification method of a flow passage forming plate that defines a part of a gas flow passage through which combustion gas flows in a gas turbine, the flow passage forming plate to be modified including:
a plate main body having a gas path surface that faces the side of the gas flow passage, and an inner surface that faces the opposite side from the gas path surface;
a peripheral wall that is provided along a peripheral edge of the plate main body, and protrudes, relative to the inner surface, toward an opposite-flow-passage side that is the side of the inner surface based on the gas path surface; and
a ledge that protrudes along an inner wall surface of the peripheral wall, from the inner surface toward the opposite-flow-passage side, and receives an impingement plate having a plurality of through-holes,
the modification method including a part removing step of removing a part of the ledge in a wall extension direction in which the peripheral wall extends.

A modification method of a flow passage forming plate of a twelfth aspect according to the present invention to achieve the above object is the modification method of a flow passage forming plate of the eleventh aspect, wherein, in the part removing step, a part of the plate main body on the side of the inner surface is removed so as to reduce the interval between the gas path surface and the inner surface of the plate main body.

Advantageous Effects of Invention

According to an aspect of the present invention, it is possible to enhance the cooling effect of cooling air on flow passage forming plates.

BRIEF DESCRIPTION OF DRAWINGS

FIG. 15 is a view showing the configuration of a vane in a first modified example of the embodiment according to the present invention, in which FIG. 15(A) is a sectional view of main parts of the vane before modification, and FIG. 15(B) is a sectional view of the main parts of the vane after modification.

FIG. 18 is a view illustrating a comparison of the configurations of vanes; in which FIG. 18(A) shows the configuration characteristic of the vane of the embodiment, FIG. 18(B) shows the configuration of a vane in Comparative Example 1, and FIG. 18(C) shows the configuration of a vane in Comparative Example 2.

DESCRIPTION OF EMBODIMENTS

In the following, an embodiment of a gas turbine including flow passage forming plates according to the present invention and various modified examples of a vane will be described in detail with reference to the drawings.

Embodiment

An embodiment of the gas turbine according to the present invention will be described with reference to FIG. 1 to FIG. 14.

Figure 1:
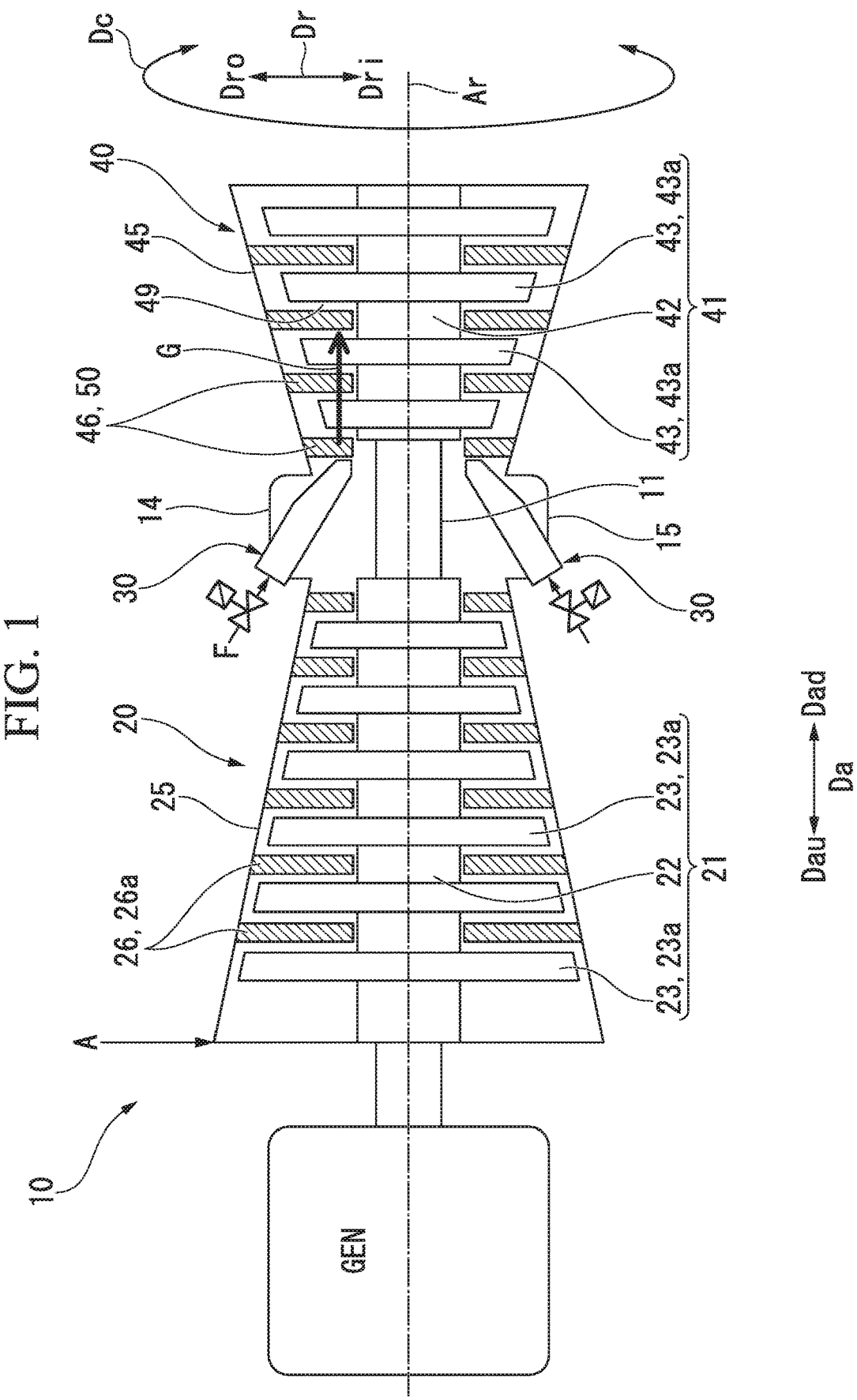
FIG. 1 is a schematic sectional view of a gas turbine in an embodiment according to the present invention.

As shown in FIG. 1, a gas turbine 10 as the embodiment according to the present invention includes a compressor 20 that compresses air A, combustors 30 that generate combustion gas by combusting fuel F in the air A compressed by the compressor 20, and a turbine 40 that is driven by the combustion gas.

The compressor 20 has a compressor rotor 21 that rotates around an axis Ar, a compressor casing 25 that covers the compressor rotor 21, and a plurality of vane rows 26. The turbine 40 has a turbine rotor 41 that rotates around the axis Ar, a turbine casing 45 that covers the turbine rotor 41, and a plurality of vane rows 46.

The compressor rotor 21 and the turbine rotor 41 are located on the same axis Ar, and are connected to each other to form a gas turbine rotor 11. For example, a rotor of a generator GEN is connected to the gas turbine rotor 11. The gas turbine 10 further includes an intermediate casing 14 that is disposed between the compressor casing 25 and the turbine casing 45. The combustors 30 are mounted on the intermediate casing 14. The compressor casing 25, the intermediate casing 14, and the turbine casing 45 are connected to one another to form a gas turbine casing 15.

Hereinafter, a direction in which the axis Ar extends will be referred to as an axial direction Da. A circumferential direction around the axis Ar will be referred to simply as a circumferential direction Dc, and a direction perpendicular to the axis Ar will be referred to as a radial direction Dr. In the axial direction Da, the side of the compressor 20 based on the turbine 40 and the opposite side will be referred to as an upstream side Dau and a downstream side Dad, respectively. In the radial direction Dr, the side closer to the axis Ar and the opposite side will be referred to as a radially inner side Dri and a radially outer side Dro, respectively.

The compressor rotor 21 has a rotor shaft 22 that extends in the axial direction Da around the axis Ar, and a plurality of blade rows 23 that are mounted on the rotor shaft 22. The plurality of blade rows 23 are arrayed in the axial direction Da. Each blade row 23 is composed of a plurality of blades 23*a* that are arrayed in the circumferential direction Dc. The vane row 26 is disposed on the upstream side Dau of each of the plurality of blade rows 23. The vane rows 26 are provided on an inner side of the compressor casing 25. Each vane row 26 is composed of a plurality of vanes 26*a* that are arrayed in the circumferential direction Dc.

The turbine rotor 41 has a rotor shaft 42 that extends in the axial direction Da around the axis Ar, and a plurality of blade rows 43 that are mounted on the rotor shaft 42. The plurality of blade rows 43 are arrayed in the axial direction Da. Each blade row 43 is composed of a plurality of blades 43*a* that are arrayed in the circumferential direction Dc. The vane row 46 is disposed on the upstream side Dau of each of the plurality of blade rows 43. The vane rows 46 are provided on an inner side of the turbine casing 45. Each vane row 46 is composed of a plurality of vanes 50 that are arrayed in the circumferential direction Dc.

Figure 2:
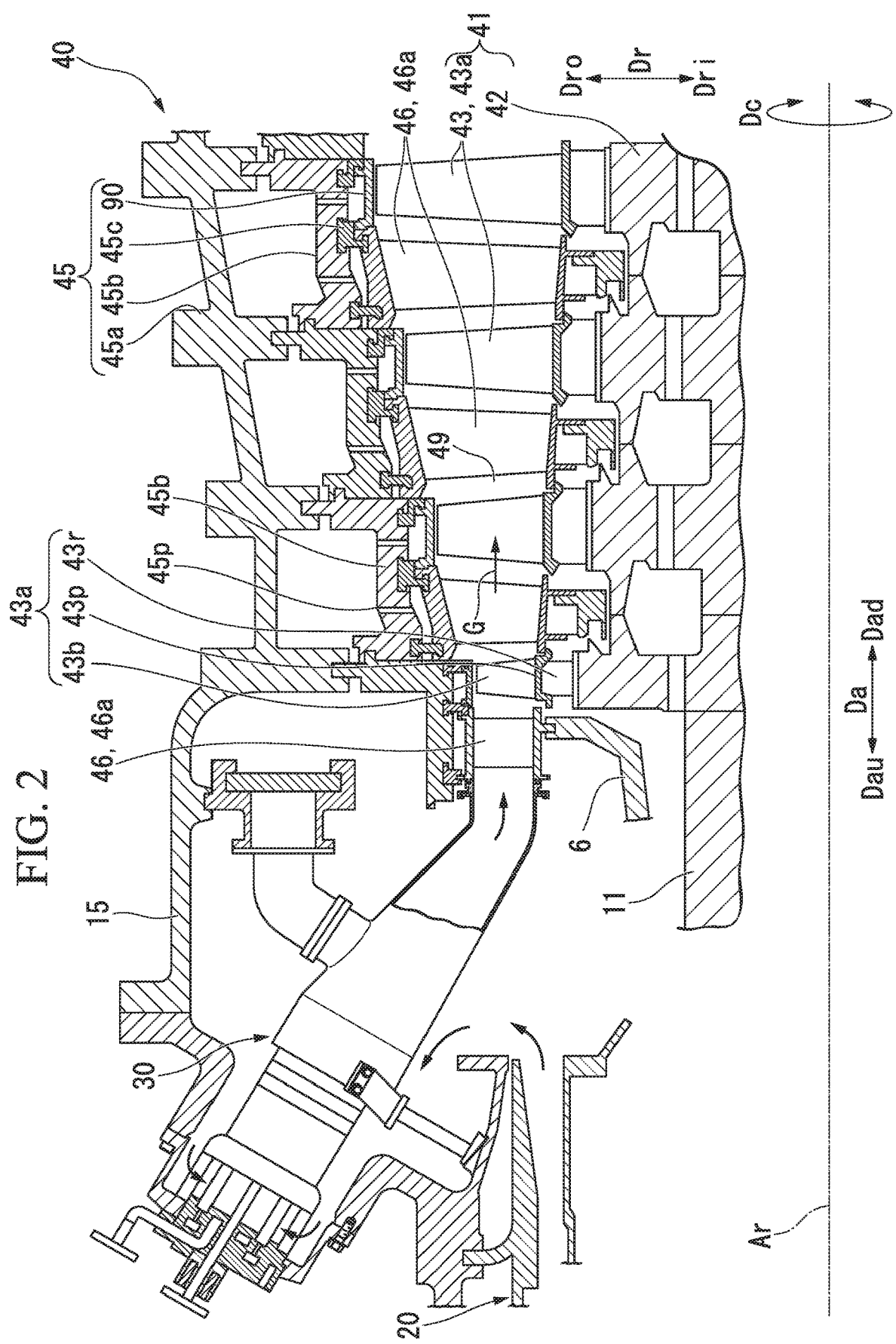
FIG. 2 is a sectional view of main parts of the gas turbine in the embodiment according to the present invention.

As shown in FIG. 2, the turbine casing 45 has a cylindrical outer casing 45*a* that constitutes an outer shell of the turbine casing 45, an inner casing 45*b* that is fixed on an inner side of the outer casing 45*a*, a plurality of ring segments 90 that are fixed on an inner side of the inner casing 45*b*, and an isolation ring 45*c* that connects the vane 50 and the ring segment 90 to the inner casing 45*b*. The plurality of ring segments 90 are each provided at a position between the adjacent vane rows 46. Thus, the blade row 43 is disposed on the radially inner side Dri of each ring segment 90.

An annular space which is defined between an outer circumferential side of the rotor shaft 42 and an inner circumferential side of the turbine casing 45 and in which the vanes 50 and the blades 43*a* are disposed in the axial direction Da forms a combustion gas flow passage 49 through which combustion gas G from the combustors 30 flows. The combustion gas flow passage 49 has an annular shape around the axis Ar, and is long in the axial direction Da. The inner casing 45*b* of the turbine casing 45 has cooling air passages 45*p* that are formed so as to extend therethrough from the radially outer side Dro to the radially inner side Dri. Cooling air having passed through the cooling air passage 45*p* is introduced into the vane 50 and the ring segment 90, and is used to cool the vane 50 and the ring segment 90. Depending on the vane row 46, air inside the gas turbine casing 15 may be supplied as cooling air to the vanes 50 composing the vane row 46, without passing through the cooling air passage of the turbine casing 45.

The blade 43*a* of the turbine 40 has a blade body 43*b* that extends in the radial direction Dr, a platform 43*p* that is formed on the radially inner side Dri of the blade body, and a blade root 43*r* that is formed on the radially inner side Dri of the platform 43*p*. The blade body 43*b* is disposed in the combustion gas flow passage 49 through which the combustion gas G passes. The platform 43*p* defines the position of the annular combustion gas flow passage 49 on the radially inner side Dri. The ring segment 90 disposed on the radially outer side Dro of the blade 43*a* defines the position of the annular combustion gas flow passage 49 on the radially outer side Dro. Thus, each of the platform 43*p* of the blade 43*a* and the ring segment 90 constitutes a flow passage forming plate. The blade root 43*r* is fitted in the rotor shaft 42.

Figure 3:
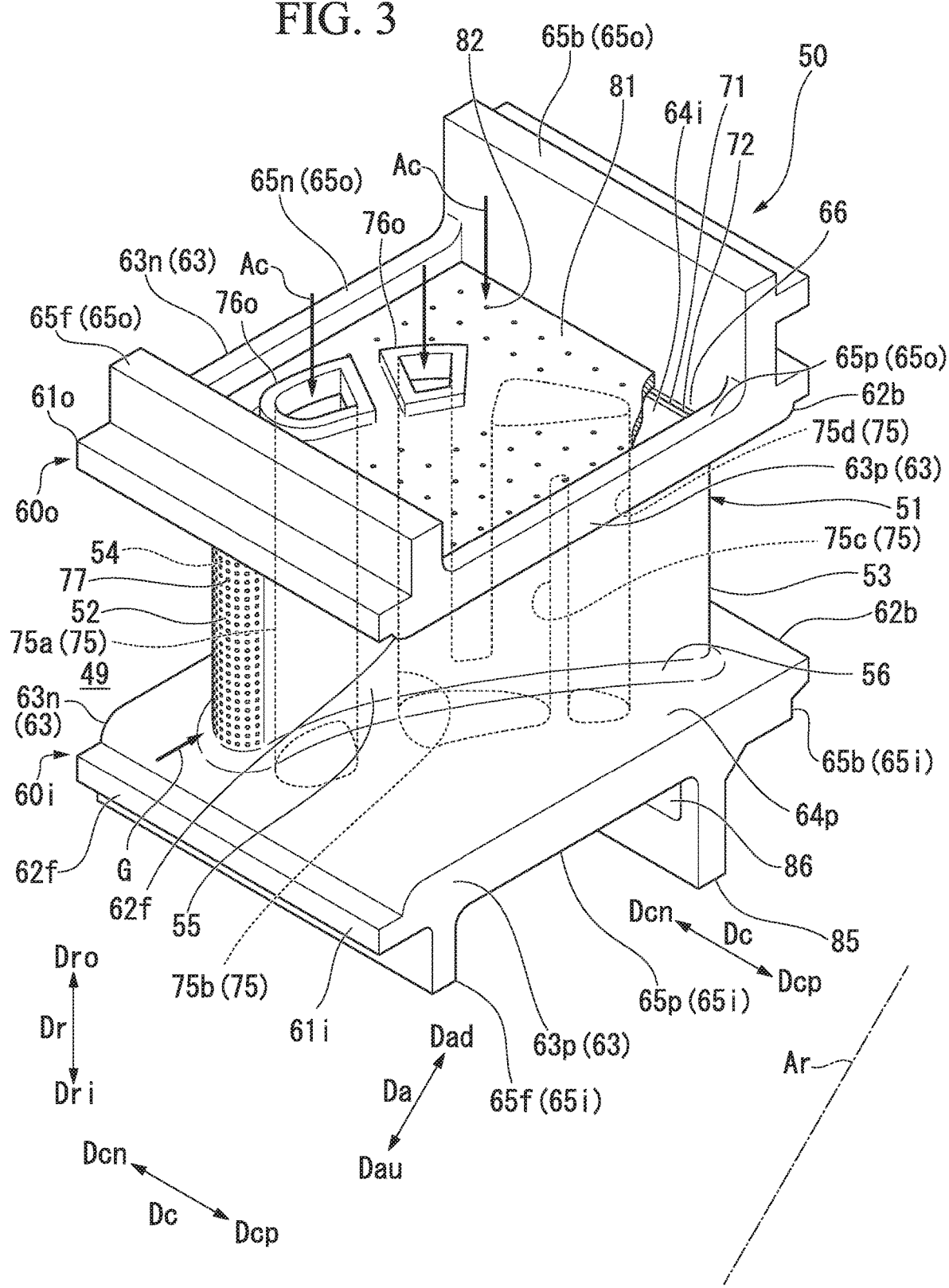
FIG. 3 is a perspective view of a vane as seen from a radially outer side in the embodiment according to the present invention.

As shown in FIG. 3, the vane 50 of the turbine 40 has a vane body 51 that extends in the radial direction Dr, an inner shroud 60*i* that is formed on the radially inner side Dri of the vane body 51, and an outer shroud 60*o* that is formed on the radially outer side Dro of the vane body 51. The vane body 51 is disposed in the combustion gas flow passage 49 through which the combustion gas G passes. The inner shroud 60*i* defines the position of the annular combustion gas flow passage 49 on the radially inner side Dri. The outer shroud 60*o* defines the position of the annular combustion gas flow passage 49 on the radially outer side Dro. Thus, each of the inner shroud 60*i* and the outer shroud 60*o* of the vane constitutes a flow passage forming plate.

As shown in FIG. 3 to FIG. 6, the vane body 51 has an airfoil shape. An end of the vane body 51 on the upstream side Dau forms a leading edge 52, and an end thereof on the downstream side Dad forms a trailing edge 53. Of surfaces of the vane body 51 facing the circumferential direction Dc, a convex surface forms a suction-side surface 54 (=negative pressure surface), and a concave surface forms a pressure-side surface 55 (=positive pressure surface). Fillets 56 are formed along the entire circumference of the vane body 51, respectively at a joint between the vane body 51 and the inner shroud 60*i* and a joint between the vane body 51 and the outer shroud 60*o*. For the convenience of the following description, in the circumferential direction Dc, the pressure side (=positive pressure-surface side) of the vane body 51 will be referred to as a circumferential pressure side Dcp, and the suction side (=negative pressure-surface side) of the vane body 51 will be referred to as a circumferential suction side Dcn. The upstream side Dau in the axial direction Da and the downstream side Dad in the axial direction Da may be referred to as a front side and a back side, respectively.

Figure 7:
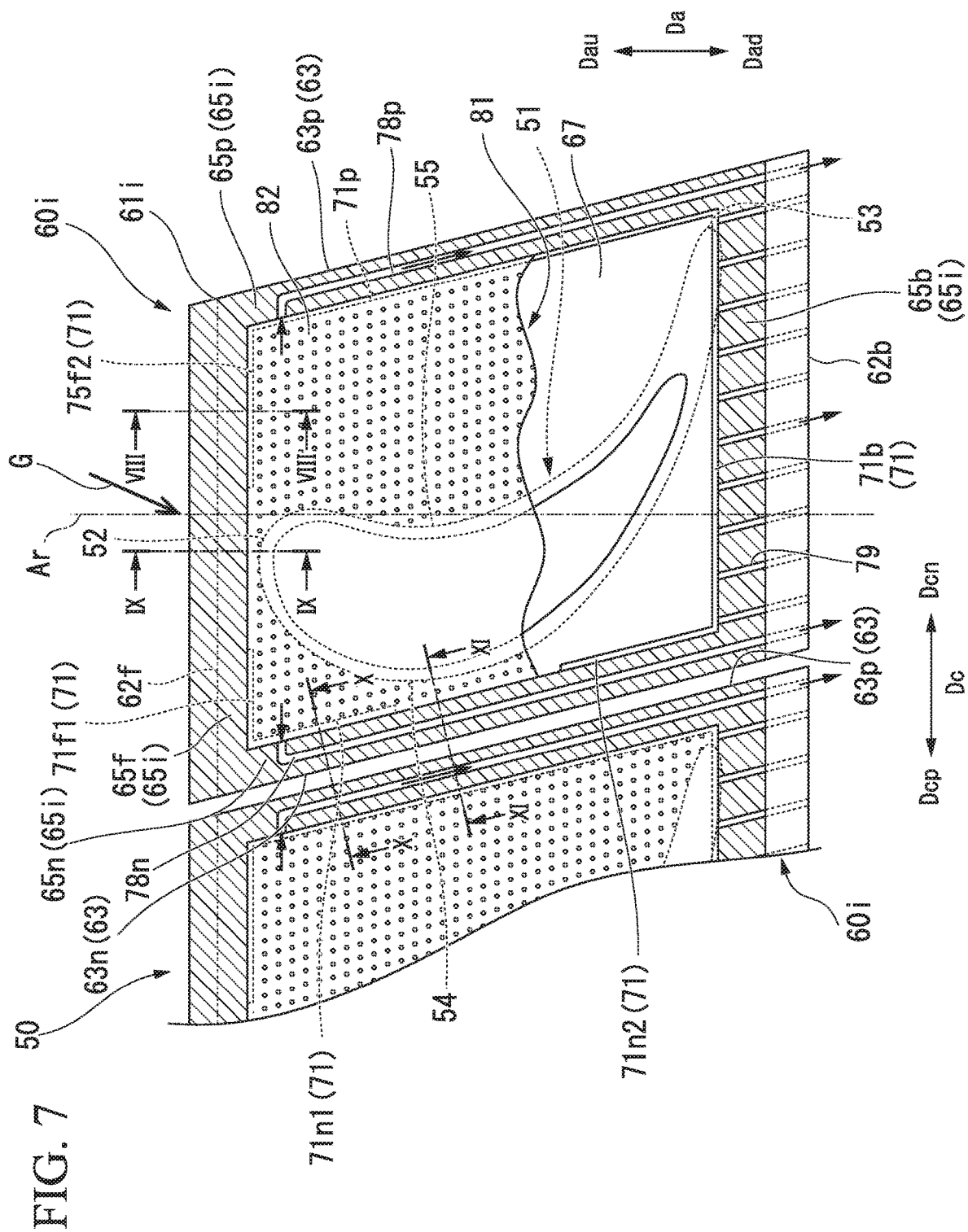
FIG. 7 is a sectional view taken along the line VII-VII of FIG. 5.

As shown in FIG. 3 to FIG. 5 and FIG. 7, the inner shroud 60*i* that is a flow passage forming plate has an inner shroud main body (plate main body) 61*i* and a peripheral wall 65*i*. The inner shroud main body 61*i* has a front end surface 62*f* that is an end surface on the upstream side Dau, a back end surface 62*b* that is an end surface on the downstream side Dad, a pair of circumferential end surfaces 63 that face the opposite sides in the circumferential direction Dc, a gas path surface 64*p* that faces the radially outer side Dro, and an inner surface 64*i* that faces the radially inner side Dri. Of the pair of circumferential end surfaces 63, the end surface on the circumferential pressure side Dcp forms a pressure-side end surface 63*p*, and the end surface on the circumferential suction side Dcn forms a suction-side end surface 63*n*. The front end surface 62*f* and the back end surface 62*b* are roughly parallel to each other. The pressure-side end surface 63*p* and the suction-side end surface 63*n* are roughly parallel to each other. Thus, when seen from the radial direction Dr, the inner shroud main body 61*i* has a parallelogram shape as shown in FIG. 7. Of the inner shrouds 60*i* of two vanes 50 adjacent to each other in the circumferential direction Dc, the pressure-side end surface 63*p* of the inner shroud 60*i* of one vane 50 and the suction-side end surface 63*n* of the inner shroud 60*i* of the other vane 50 face each other across a gap in the circumferential direction Dc. A seal plate (not shown)

is disposed between the pressure-side end surface 63p of the inner shroud 60i of the one vane 50 and the suction-side end surface 63n of the inner shroud 60i of the other vane 50.

The peripheral wall 65i has a front wall 65f and a back wall 65b facing each other in the axial direction Da, and a pair of side walls 65p, 65n facing each other in the circumferential direction Dc. Of the pair of side walls 65p, 65n, the side wall on the circumferential pressure side Dcp forms a pressure-side wall 65p, and the side wall on the circumferential suction side Dcn forms a suction-side wall 65n. Each of the front wall 65f and the back wall 65b protrudes, relative to the inner shroud main body 61i, farther toward the radially inner side Dri than the pair of side walls 65p, 65n. The inner shroud 60i has a recess 66 (see FIG. 4 and FIG. 5) that is formed by the inner shroud main body 61i and the peripheral wall 65i and recessed toward the radially outer side Dro. The surface of the pressure-side wall 65p on the circumferential pressure side Dcp and the surface of the inner shroud main body 61i on the circumferential pressure side Dcp are flush with each other. The surface of the suction-side wall 65n on the circumferential suction side Dcn and the surface of the inner shroud main body 61i on the circumferential suction side Dcn are flush with each other.

The vanes 50 composing one vane row 46 of the plurality of vane rows 46 are each provided with a retainer 85 that protrudes from the pair of side walls 65p, 65n of the inner shroud 60i toward the radially inner side Dri. The retainer 85 is located between the front wall 65f and the back wall 65b in the axial direction Da, and is formed from the pressure-side end surface 63p to the suction-side end surface 63n. A pressure-side end surface of the retainer 85 is flush with the pressure-side end surface 63p of the inner shroud main body 61i. Although this is not shown, a suction-side end surface of the retainer 85 is flush with the suction-side end surface 63n of the inner shroud main body 61i. The retainer 85 comes in contact with a radially outer end 6a (see FIG. 5) on the downstream side of an inner cover 6 that is fixed to the gas turbine casing 15, and serves to support a part of the vane 50 on the radially inner side Dri onto the radially outer end 6a of the inner cover 6. The retainer 85 has an opening 86 (hereinafter referred to as a retainer opening 86) that is formed so as to extend therethrough in the axial direction Da. A space formed by the retainer opening 86 communicates with a space formed by the recess 66 of the inner shroud 60i.

Figure 4:
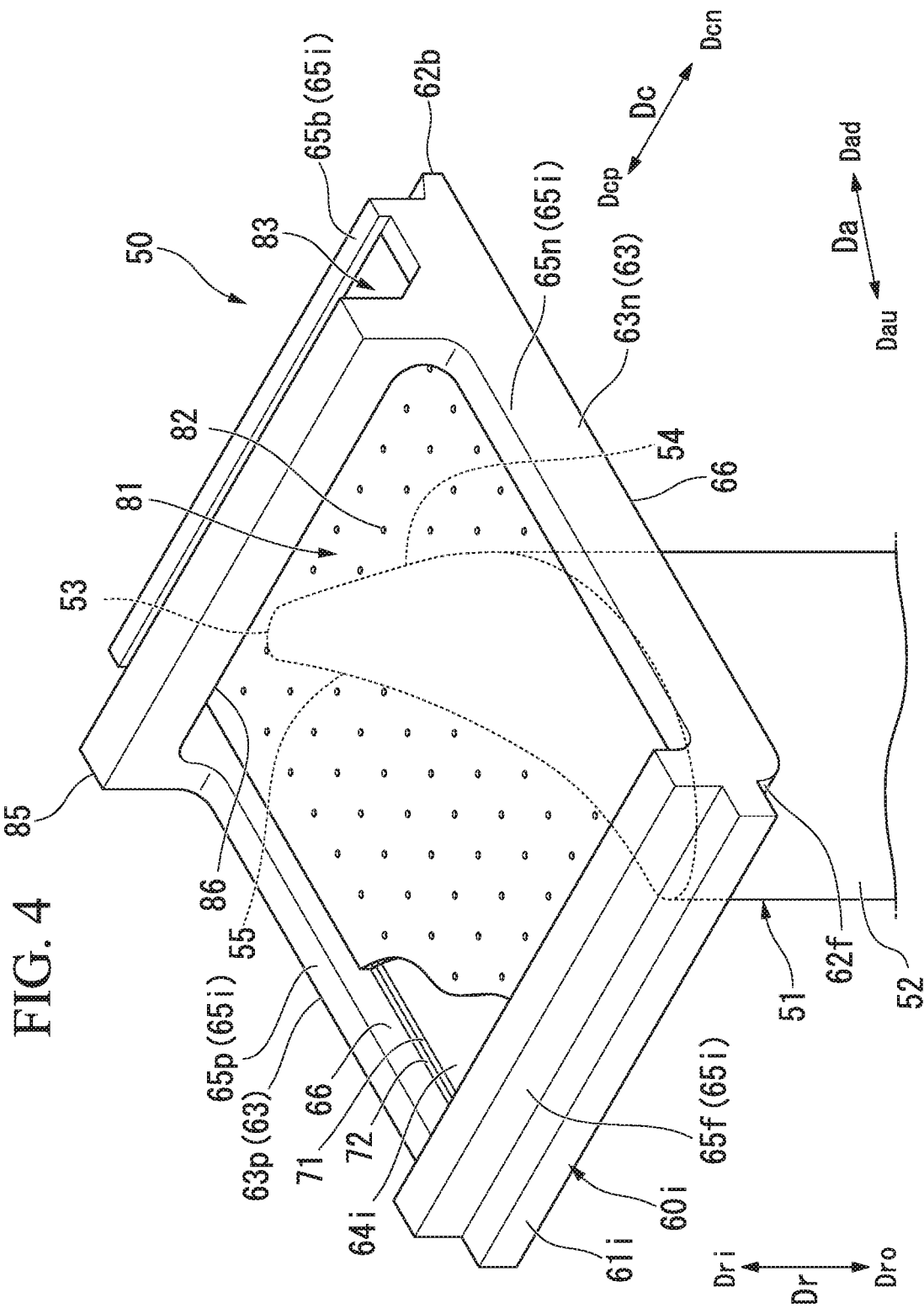
FIG. 4 is a perspective view of the vane as seen from a radially inner side in the embodiment according to the present invention.
Figure 5:
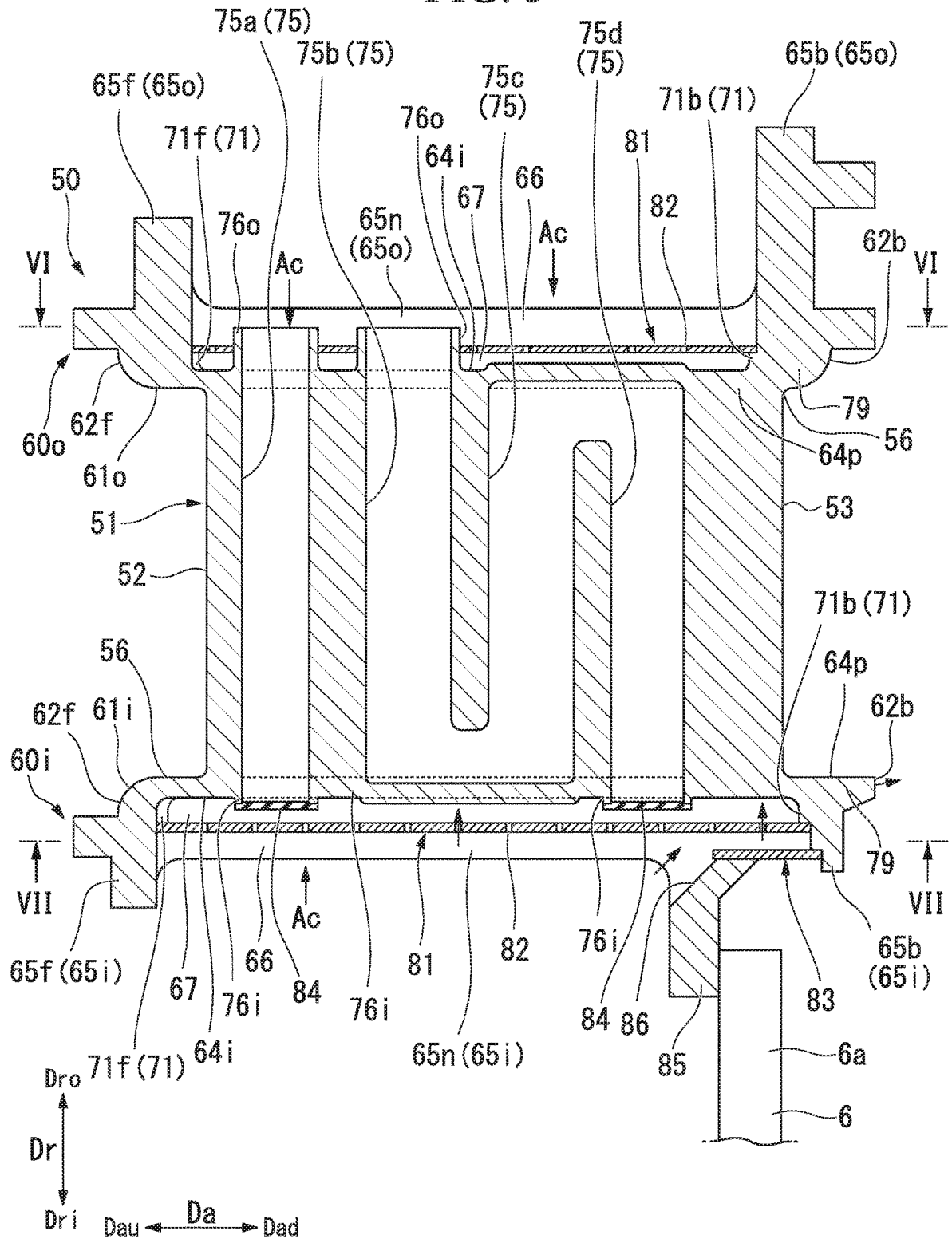
FIG. 5 is a cutaway side view of main parts of the vane in the embodiment according to the present invention.

As shown in FIG. 4 and FIG. 5, the vane 50 further includes an impingement plate 81. The vane 50 that is provided with the retainer 85 includes the impingement plate 81 and a seal plate 83. The impingement plate 81 partitions the space inside the recess 66 of the inner shroud 60i into a region on the radially inner side Dri and an inner cavity 67 that is a region on the radially outer side Dro. The impingement plate 81 has a plurality of through-holes 82 that are formed so as to extend therethrough in the radial direction Dr. Part of the cooling air Ac present on the radially inner side Dri of the vane 50 flows into the inner cavity 67 through the through-holes 82 of the impingement plate 81. The seal plate 83 covers a part of an opening of the recess 66 on the downstream side from the retainer 85. The seal plate 83 is located farther on the downstream side Dad than the retainer 85 and farther on the radially inner side Dri than the impingement plate 81.

Figure 8:
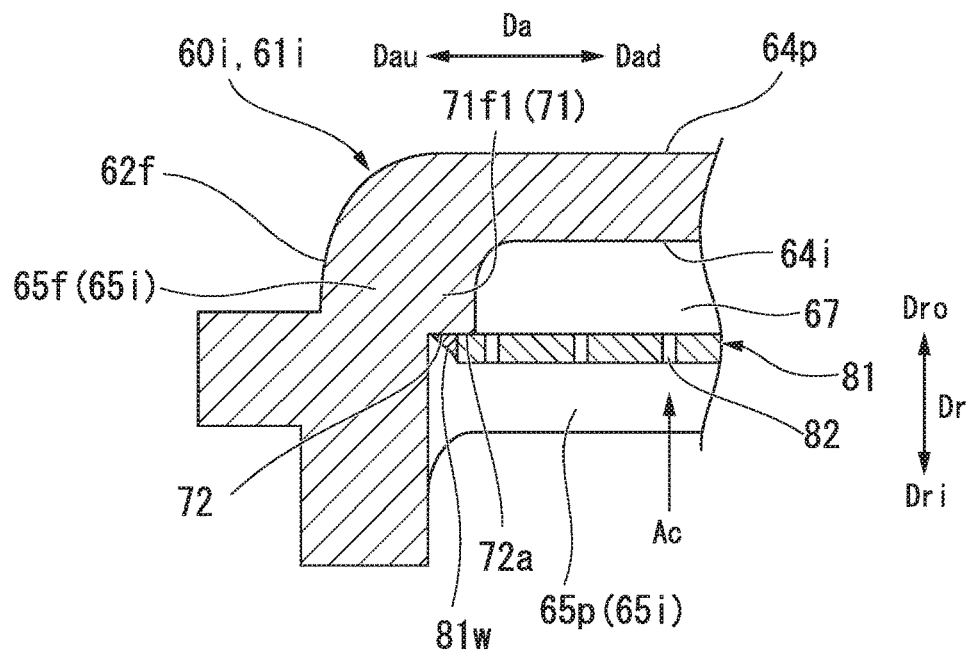
FIG. 8 is a sectional view taken along the line VIII-VIII of FIG. 7.
Figure 9:
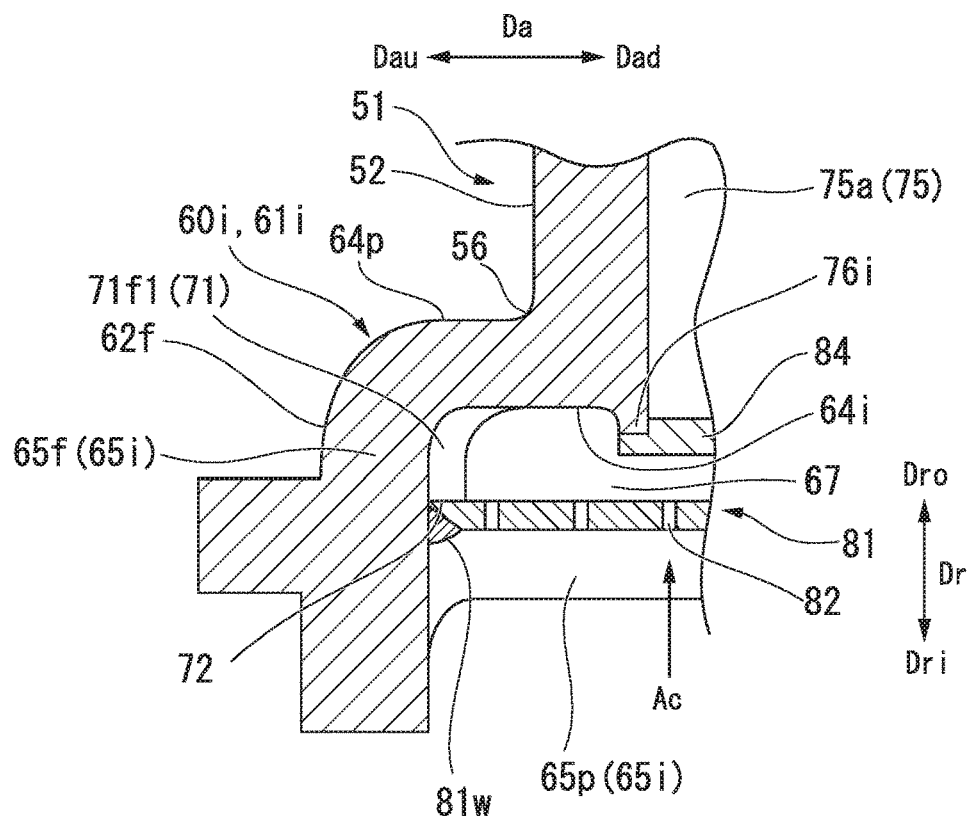
FIG. 9 is a sectional view taken along the line IX-IX of FIG. 7.
Figure 10:
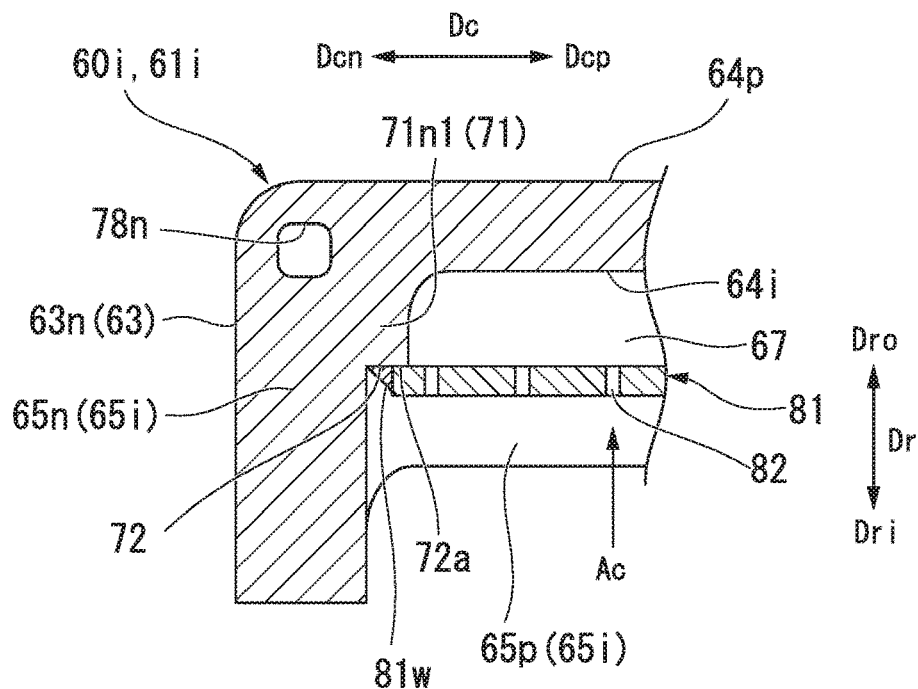
FIG. 10 is a sectional view taken along the line X-X of FIG. 7.
Figure 11:
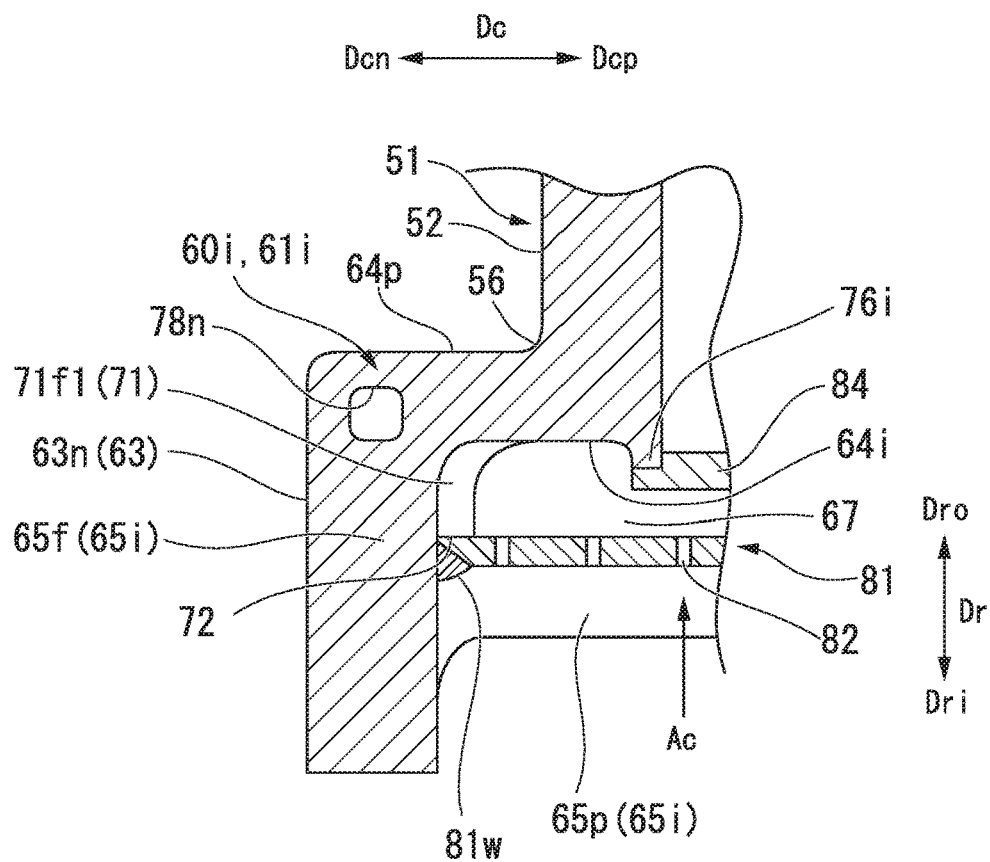
FIG. 11 is a sectional view taken along the line XI-XI of FIG. 7.

The inner shroud 60i is provided with ledges 71 that receive the impingement plate 81. The ledge 71 protrudes along an inner wall surface of the peripheral wall 65i, from the inner surface 64i of the inner shroud main body 61i toward the radially inner side Dri. Thus, relative to the inner surface of the inner shroud main body 61i, the ledge 71 protrudes toward an opposite-flow-passage side (Dri) that is the inner surface side based on the gas path surface. The ledge 71 has a receiving surface 72 that faces the radially inner side Dri, in other words, the opposite-flow-passage side. The impingement plate 81 comes in contact with a contact region 72a that is a region of the receiving surface 72. The contact region 72a is a region of the receiving surface 72 that is separated from the inner wall surface of the peripheral wall 65i. As shown in FIG. 8, the impingement plate 81 is fillet-welded to a region of the inner shroud 60i where the ledge 71 is provided, on a region of the receiving surface 72 except for the contact region 72a, in a state where the impingement plate 81 is in contact only with the contact region 72a of the receiving surface 72. Thus, a welded part 81w is formed between a peripheral edge of the impingement plate 81 and the receiving surface 72. Moreover, as shown in FIG. 9, the impingement plate 81 is butt-welded at the peripheral edge thereof to a region of the inner shroud 60i where the ledge 71 is not provided, on the inner wall surface of the peripheral wall 65i. Thus, a welded part 81w is formed between the peripheral edge of the impingement plate 81 and the inner wall surface of the peripheral wall 65i.

As shown in FIG. 6 and FIG. 8 to FIG. 11, the ledges 71 of the inner shroud 60i include a first front ledge 71f1 and a second front ledge 71f2 that are provided along an inner wall surface of the front wall 65f, a back ledge 71b that is provided along an inner wall surface of the back wall 65b, a pressure-side ledge 71p that is provided along an inner wall surface of the pressure-side wall 65p, and a first suction-side ledge 71n1 and a second suction-side ledge 71n2 that are provided along an inner wall surface of the suction-side wall 65n.

Each of the first front ledge 71f1 and the second front ledge 71f2 protrudes from the inner wall surface of the front wall 65f toward the back wall 65b, and protrudes from the inner surface 64i of the inner shroud main body 61i toward the radially inner side Dri. Each of the first front ledge 71f1 and the second front ledge 71f2 extends in a front wall extension direction in which the front wall 65f extends. This front wall extension direction is the circumferential direction Dc. The first front ledge 71f1 extends from the inner wall surface of the suction-side wall 65n toward the circumferential pressure side Dcp. The second front ledge 71f2 extends from the inner wall surface of the pressure-side wall 65p toward the circumferential suction side Dcn. The first front ledge 71f1 and the second front ledge 71f2 are separated from each other in the front wall extension direction. Thus, the ledge 71 is not provided between the first front ledge 71f1 and the second front ledge 71f2 in the front wall extension direction. The leading edge 52 of the vane body 51 is located between the first front ledge 71f1 and the second front ledge 71f2 in the front wall extension direction, i.e., in the region where the ledge 71 is not provided. The region where the ledge 71 is not provided is the region where the leading edge 52 of the vane body 51 is closest to the front wall 65f. The leading edge 52 is a region that is easily heated under the influence of a horseshoe vortex flow of the combustion gas G. A horseshoe vortex flow is a vortex flow formed by the combustion gas G as it hits a wall surface and then splits to right and left in a horseshoe shape. Accordingly, the thicknesses of the region of the front wall 65f where the ledge 71 is not provided, and of the wall or the plate having the region of the inner surface 64i where the ledge 71 is not provided are partially reduced, so that cooling of the leading edge 52 that is easy heated is enhanced.

The back ledge 71b protrudes from the inner wall surface of the back wall 65b toward the front wall 65f, and protrudes from the inner surface 64i of the inner shroud main body 61i toward the radially inner side Dri. The back ledge 71b extends from the inner wall surface of the suction-side wall 65n to the inner wall surface of the pressure-side wall 65p, in a back wall extension direction in which the back wall 65b extends. Like the front wall extension direction, this back wall extension direction is also the circumferential direction Dc.

The pressure-side ledge 71p protrudes from the inner wall surface of the pressure-side wall 65p toward the suction-side wall 65n, and protrudes from the inner surface 64i of the inner shroud main body 61i toward the radially inner side Dri. The pressure-side ledge 71p extends from the inner wall surface of the front wall 65f to the inner wall surface of the back wall 65b, in a pressure-side wall extension direction in which the pressure-side wall 65p extends.

Each of the first suction-side ledge 71n1 and the second suction-side ledge 71n2 protrudes from the inner wall surface of the suction-side wall 65n toward the pressure-side wall 65p, and protrudes from the inner surface 64i of the inner shroud main body 61i toward the radially inner side Dri. Each of the first suction-side ledge 71n1 and the second suction-side ledge 71n2 extends in a suction-side wall extension direction in which the suction-side wall 65n extends. The first suction-side ledge 71n1 extends from the inner wall surface of the front wall 65f toward the back wall 65b. The second suction-side ledge 71n2 extends from the inner wall surface of the back wall 65b toward the front wall 65f. The first suction-side ledge 71n1 and the second suction-side ledge 71n2 are separated from each other in the suction-side wall extension direction. Thus, the ledge 71 is not provided between the first suction-side ledge 71n1 and the second suction-side ledge 71n2 in the suction-side wall extension direction. A part of the suction-side surface 54 of the vane body 51 that is closest to the suction-side end surface 63n of the inner shroud main body 61i is located in the region between the first suction-side ledge 71n1 and the second suction-side ledge 71n2 in the suction-side wall extension direction, i.e., in the region where the ledge 71 is not provided. The region where the ledge 71 is not provided is the region where the fillet 56 formed on the outer circumference of the vane body 51 on the suction side is closest to the suction-side end surface 63n. Accordingly, the thicknesses of the suction-side wall 65n having the region of the suction-side end surface 63n where the ledge 71 is not provided, and of the wall or the plate having the region of the inner surface 64i where the ledge 71 is not provided are partially reduced, so that cooling of the fillet 56 is enhanced.

As shown in FIG. 3 and FIG. 5, the outer shroud 60o that is a flow passage forming plate has an outer shroud main body (plate main body) 61o and a peripheral wall 65o. Like the inner shroud main body 61i, the outer shroud main body 61o has a front end surface 62f, a back end surface 62b, a pair of circumferential end surfaces 63, a gas path surface 64p, and an inner surface 64i. Of the pair of circumferential end surfaces 63, the end surface on the circumferential pressure side Dcp forms a pressure-side end surface 63p, and the end surface on the circumferential suction side Dcn forms a suction-side end surface 63n. Like the inner shroud main body 61i, the outer shroud main body 61o has a parallelogram shape when seen from the radial direction Dr.

The peripheral wall 65o has a front wall 65f and a back wall 65b facing each other in the axial direction Da, and a pair of side walls 65p, 65n facing each other in the circumferential direction Dc. Of the pair of side walls 65p, 65n, the side wall on the circumferential pressure side Dcp forms a pressure-side wall 65p, and the side wall on the circumferential suction side Dcn forms a suction-side wall 65n. Each of the front wall 65f and the back wall 65b protrudes, relative to the outer shroud main body 61o, farther toward the radially outer side Dro than the pair of side walls 65p, 65n, and forms a hook. The front wall 65f and the back wall 65b forming the hooks serve to mount the vane 50 on the inner circumferential side of the turbine casing 45. Specifically, the front wall 65f and the back wall 65b forming the hooks are mounted on the isolation ring 45c (see FIG. 2) that constitutes a part of the turbine casing 45. The outer shroud 60o has a recess 66 that is formed by the outer shroud main body 61o and the peripheral wall 65o and recessed toward the radially inner side Dri. The surface of the pressure-side wall 65p on the circumferential pressure side Dcp and the surface of the outer shroud main body 61o on the circumferential pressure side Dcp are flush with each other. The surface of the suction-side wall 65n on the circumferential suction side Dcn and the surface of the outer shroud main body 61o on the circumferential suction side Dcn are flush with each other.

As shown in FIG. 5, the vane 50 further includes an impingement plate 81 that partitions a space inside the recess 66 of the outer shroud 60o into a region on the radially outer side Dro and an inner cavity 67 that is a region on the radially inner side Dri. The impingement plate 81 has a plurality of through-holes 82 that are formed so as to extend therethrough in the radial direction Dr. Part of the cooling air Ac present on the radially outer side Dro of the vane 50 flows into the inner cavity 67 through the through-holes 82 of the impingement plate 81.

The outer shroud 60o is provided with ledges 71 that receive the impingement plate 81. The ledge 71 protrudes along an inner wall surface of the peripheral wall 65o, from the inner surface 64i of the outer shroud main body 61o toward the radially outer side Dro. Thus, relative to the inner surface 64i of the outer shroud main body 61o, the ledge 71 protrudes toward the opposite-flow-passage side (Dri) that is the side of the inner surface 64i based on the gas path surface 64p. The ledge 71 has a receiving surface 72 that faces the radially outer side Dro, in other words, the opposite-flow-passage side. Like the impingement plate 81 of the inner shroud 60i, this impingement plate 81 comes in contact with a contact region 72a that is a region of the receiving surface 72. The impingement plate 81 is fillet-welded to a region of the outer shroud 60o where the ledge 71 is provided, on a region of the receiving surface 72 except for the contact region 72a, in a state where the impingement plate 81 is in contact only with the contact region 72a of the receiving surface 72. Thus, a welded part 81w is formed between a peripheral edge of the impingement plate 81 and the receiving surface 72. Moreover, the impingement plate 81 is butt-welded at the peripheral edge thereof to a region of the outer shroud 60o where the ledge 71 is not provided, on the inner wall surface of the peripheral wall 65o. Thus, a welded part 81w is formed between the peripheral edge of the impingement plate 81 and the inner wall surface of the peripheral wall 65o.

Figure 6:
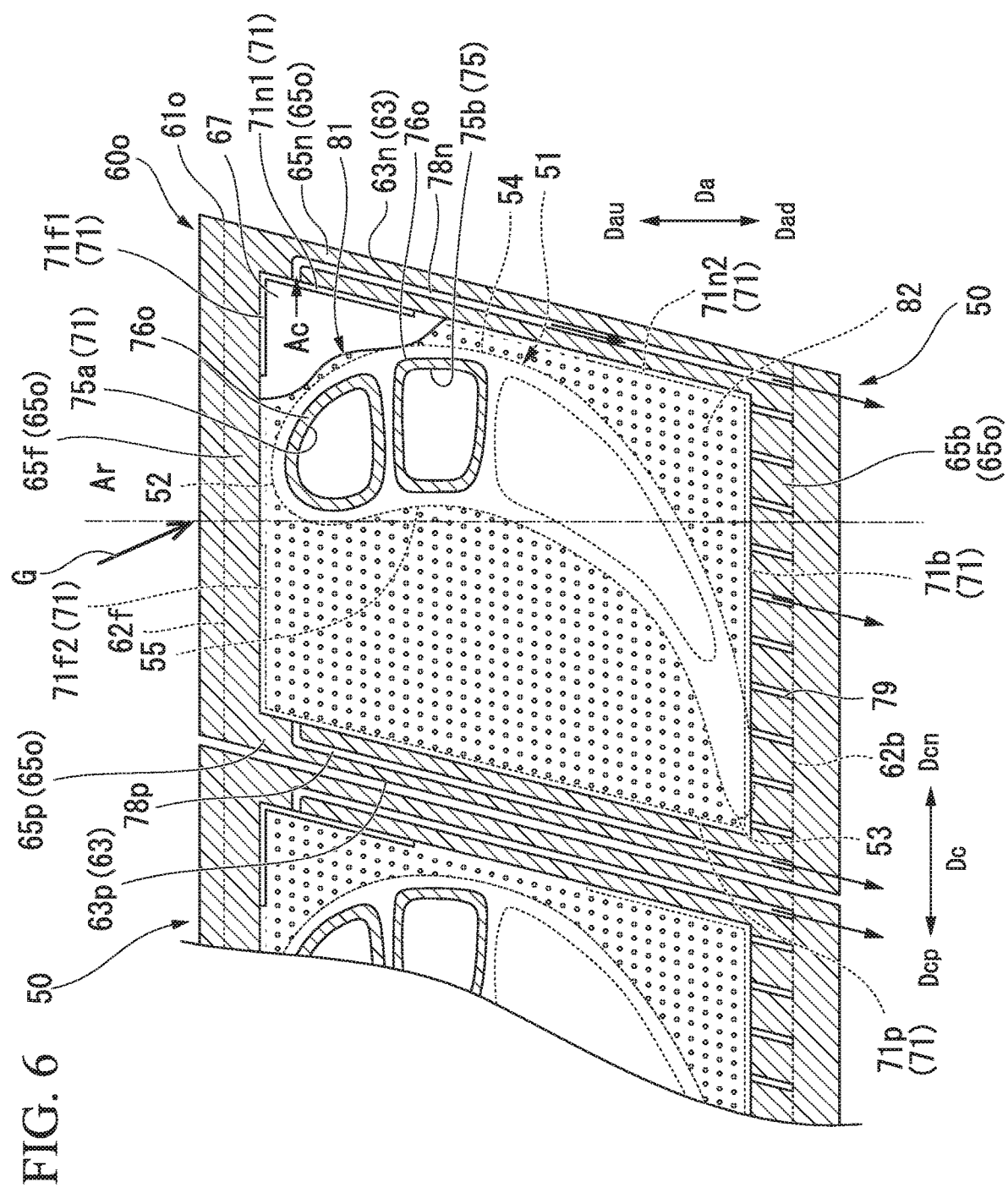
FIG. 6 is a sectional view taken along the line VI-VI of FIG. 5.

As shown in FIG. 6, the ledges 71 of the outer shroud 60o include a first front ledge 71f1 and a second front ledge 71f2 that are provided along an inner wall surface of the front wall 65f, a back ledge 71b that is provided along an inner wall surface of the back wall 65b, a pressure-side ledge 71p that is provided along an inner wall surface of the pressure-side wall 65p, and a first suction-side ledge 71n1 and a second suction-side ledge 71n2 that are provided along an inner wall surface of the suction-side wall 65n.

Each of the first front ledge 71f1 and the second front ledge 71f2 protrudes from the inner wall surface of the front wall 65f toward the back wall 65b, and protrudes from the inner surface 64i of the outer shroud main body 61o toward the radially outer side Dro. Each of the first front ledge 71f1 and the second front ledge 71f2 extends in a front wall extension direction in which the front wall 65f extends. This front wall extension direction is the circumferential direction Dc. The first front ledge 71f1 extends from the inner wall surface of the suction-side wall 65n toward the circumferential pressure side Dcp. The second front ledge 71f2 extends from the inner wall surface of the pressure-side wall 65p toward the circumferential suction side Dcn. The first front ledge 71f1 and the second front ledge 71f2 are separated from each other in the front wall extension direction. Thus, the ledge 71 is not provided between the first front ledge 71f1 and the second front ledge 71f2 in the front wall extension direction. The leading edge 52 of the vane body 51 is located between the first front ledge 71f1 and the second front ledge 71f2 in the front wall extension direction, i.e., in the region where the ledge 71 is not provided. The region where the ledge 71 is not provided is the region where the leading edge 52 of the vane body 51 is closest to the front wall 65f. As described above, the leading edge 52 is a region that is easily heated under the influence of a horseshoe vortex flow of the combustion gas G. Accordingly, the thicknesses of the region of the front wall 65f where the ledge 71 is not provided, and of the wall or the plate having the region of the inner surface 64i where the ledge 71 is not provided are partially reduced, so that cooling of the leading edge 52 that is easily heated is enhanced.

The back ledge 71b protrudes from the inner wall surface of the back wall 65b toward the front wall 65f, and protrudes from the inner surface 64i of the outer shroud main body 61o toward the radially outer side Dro. The back ledge 71b extends from the inner wall surface of the suction-side wall 65n to the inner wall surface of the pressure-side wall 65p, in a back wall extension direction in which the back wall 65b extends. This back wall extension direction is the circumferential direction Dc.

The pressure-side ledge 71p protrudes from the inner wall surface of the pressure-side wall 65p toward the suction-side wall 65n, and protrudes from the inner surface 64i of the outer shroud main body 61o toward the radially outer side Dro. The pressure-side ledge 71p extends from the inner wall surface of the front wall 65f to the inner wall surface of the back wall 65b, in a pressure-side wall extension direction in which the pressure-side wall 65p extends.

Each of the first suction-side ledge 71n1 and the second suction-side ledge 71n2 protrudes from the inner wall surface of the suction-side wall 65n toward the pressure-side wall 65p, and protrudes from the inner surface 64i of the outer shroud main body 61o toward the radially outer side Dro. Each of the first suction-side ledge 71n1 and the second suction-side ledge 71n2 extends in a suction-side wall extension direction in which the suction-side wall 65n extends. The first suction-side ledge 71n1 extends from the inner wall surface of the front wall 65f toward the back wall 65b. The second suction-side ledge 71n2 extends from the inner wall surface of the back wall 65b toward the front wall 65f. The first suction-side ledge 71n1 and the second suction-side ledge 71n2 are separated from each other in the suction-side wall extension direction. Thus, the ledge 71 is not provided between the first suction-side ledge 71n1 and the second suction-side ledge 71n2 in the suction-side wall extension direction. A part of the suction-side surface of the vane body 51 that is closest to the suction-side end surface 63n of the outer shroud main body 61o is located between the first suction-side ledge 71n1 and the second suction-side ledge 71n2 in the suction-side wall extension direction, i.e., in the region where the ledge 71 is not provided. The region where the ledge 71 is not provided is the region where the fillet 56 formed on the outer circumference of the vane body 51 on the suction side is closest to the suction-side end surface 63n. Accordingly, the thicknesses of the suction-side wall 65n having the region of the suction-side end surface 63n where the ledge 71 is not provided, and of the wall or the plate having the region of the inner surface 64i where the ledge 71 is not provided are partially reduced, so that cooling of the fillet 56 is enhanced.

As shown in FIG. 3 and FIG. 5, a plurality of vane air passages 75 extending in the radial direction Dr are formed inside the vane body 51, the outer shroud 60o, and the inner shroud 60i. Each vane air passage 75 is formed continuously from the outer shroud 60o through the vane body 51 to the inner shroud 60i. The plurality of vane air passages 75 are arrayed along the chord of the vane body 51. Some of adjacent vane air passages 75 communicate with each other at a part on the radially outer side Dro or at a part on the radially inner side Dri. One of the plurality of vane air passages 75 is open on the radially outer side Dro. Moreover, a plurality of vane air passages 75 are closed on the radially outer side Dro. A part of the vane air passage that defines the radially outer side Dro protrudes farther toward the radially outer side Dro than the inner surface 64i of the outer shroud main body 61o, and thus forms an outer lip 76o. A part of the vane air passage 75 that defines the radially inner side Dri protrudes farther toward the radially inner side Dri than the inner surface 64i of the inner shroud main body 61i, and thus forms an inner lip 76i.

Here, it is assumed that there are four vane air passages 75. Of these four vane air passages 75, the vane air passage 75 located farthest on the upstream side Dau will be referred to as a first vane air passage 75a. Subsequently, a second vane air passage 75b, a third vane air passage 75c, and a fourth vane air passage 75d are assumed to be arrayed in the order mentioned, on the downstream side based on the first vane air passage 75a. A part of the second vane air passage 75b on the radially inner side Dri communicates with a part of the third vane air passage 75c on the radially inner side Dri. A part of the third air passage on the radially outer side Dro communicates with a part of the fourth vane air passage 75d on the radially outer side Dro.

Ends of the outer lips 76o of the first vane air passage 75a and the second vane air passage 75b on the radially outer side Dro protrude from the impingement plate 81 of the outer shroud 60o toward the radially outer side Dro. The ends of the outer lips 76o of the first vane air passage 75a and the second vane air passage 75b on the radially outer side Dro are open. The cooling air Ac flows through these openings into the first vane air passage 75a and the second vane air passage 75b. Ends of the outer lips 76o of the third vane air passage 75c and the fourth vane air passage 75d on the radially outer side Dro protrude farther toward the radially outer side Dro than the inner surface 64i of the outer shroud main body 61o, but are located farther on the radially inner side Dri than the impingement plate 81 of the outer shroud 60o. The ends of the outer lips 76o of the third vane air passage 75c and the fourth vane air passage 75d on the radially outer side Dro are closed.

Ends of the inner lips 76i of the first vane air passage 75a, the second vane air passage 75b, the third vane air passage 75c, and the fourth vane air passage 75d on the radially inner side Dri protrude farther toward the radially inner side Dri than the inner surface 64i of the inner shroud main body 61i, but are located farther on the radially outer side Dro than the impingement plate 81 of the inner shroud 60i. The ends of the inner lips 76i of the second vane air passage 75b and the third vane air passage 75c on the radially inner side Dri are closed. On the other hand, each of the ends of the inner lips 76i of the first vane air passage 75a and the fourth vane air passage 75d on the radially inner side Dri is closed with a cap 84. For example, the cap 84 is joined by welding to the end of the inner lip 76i on the radially inner side Dri.

The leading edge 52 and the trailing edge 53 of the vane body 51 have a plurality of vane surface blow-out passages 77 that are formed so as to extend therethrough from the vane air passage 75 to the combustion gas flow passage 49. The vane body 51 is cooled in the process of the cooling air Ac flowing through the vane air passages 75. The cooling air Ac having flowed into the vane air passage 75 flows out of the vane surface blow-out passages 77 into the combustion gas flow passage 49. Thus, the leading edge 52 and the trailing edge 53 of the vane body 51 are cooled in the process of the cooling air Ac flowing out of the vane surface blow-out passages 77. Moreover, part of the cooling air Ac having flowed out of the vane surface blow-out passages 77 into the combustion gas flow passage 49 serves also as film-cooling air by partially covering the surface of the vane body 51.

As shown in FIG. 6, the pressure-side wall 65p of the outer shroud 60o has a pressure-side passage 78p that is formed so as to extend along the pressure-side end surface 63p in a direction having a component of the axial direction Da. The suction-side wall 65n of the outer shroud 60o has a suction-side passage 78n that is formed so as to extend along the suction-side end surface 63n in a direction having a component of the axial direction Da. Each of the pressure-side passage 78p and the suction-side passage 78n communicates at an upstream end thereof with the inner cavity 67. Each of the pressure-side passage 78p and the suction-side passage 78n opens at a downstream end thereof in the back end surface 62b of the outer shroud main body 61o. As shown in FIG. 5 and FIG. 6, the outer shroud main body 61o and the back wall 65b have a plurality of back end surface blow-out passages 79 that are formed so as to extend across the outer shroud main body 61o and the back wall 65b, from the inner cavity 67 toward the back end surface 62b of the outer shroud main body 61o. The plurality of back end surface blow-out passages 79 communicate at upstream ends thereof with the inner cavity 67. Downstream ends of the back end surface blow-out passages 79 are open in the back end surface 62b of the outer shroud main body 61o.

As shown in FIG. 7, like the pressure-side wall 65p of the outer shroud 60o, the pressure-side wall 65p of the inner shroud 60i has a pressure-side passage 78p that is formed so as to extend along the pressure-side end surface 63p in a direction having a component of the axial direction Da. Like the suction-side wall 65n of the outer shroud 60o, the suction-side wall 65n of the inner shroud 60i has a suction-side passage 78n that is formed so as to extend along the suction-side end surface 63n in a direction having a component of the axial direction Da. Each of the pressure-side passage 78p and the suction-side passage 78n communicates at an upstream end thereof with the inner cavity 67. Each of the pressure-side passage 78p and the suction-side passage 78n is open at a downstream end thereof in the back end surface 62b of the inner shroud main body 61i. As shown in FIG. 5 and FIG. 7, the inner shroud main body 61i and the back wall 65b have a plurality of back end surface blow-out passages 79 that are formed so as to extend across the inner shroud main body 61i and the back wall 65b, from the inner cavity 67 toward the back end surface 62b of the inner shroud main body 61i. The plurality of back end surface blow-out passages 79 communicate at upstream ends thereof with the inner cavity 67. Downstream ends of the back end surface blow-out passages 79 are open in the back end surface 62b of the inner shroud main body 61i.

Figure 12:
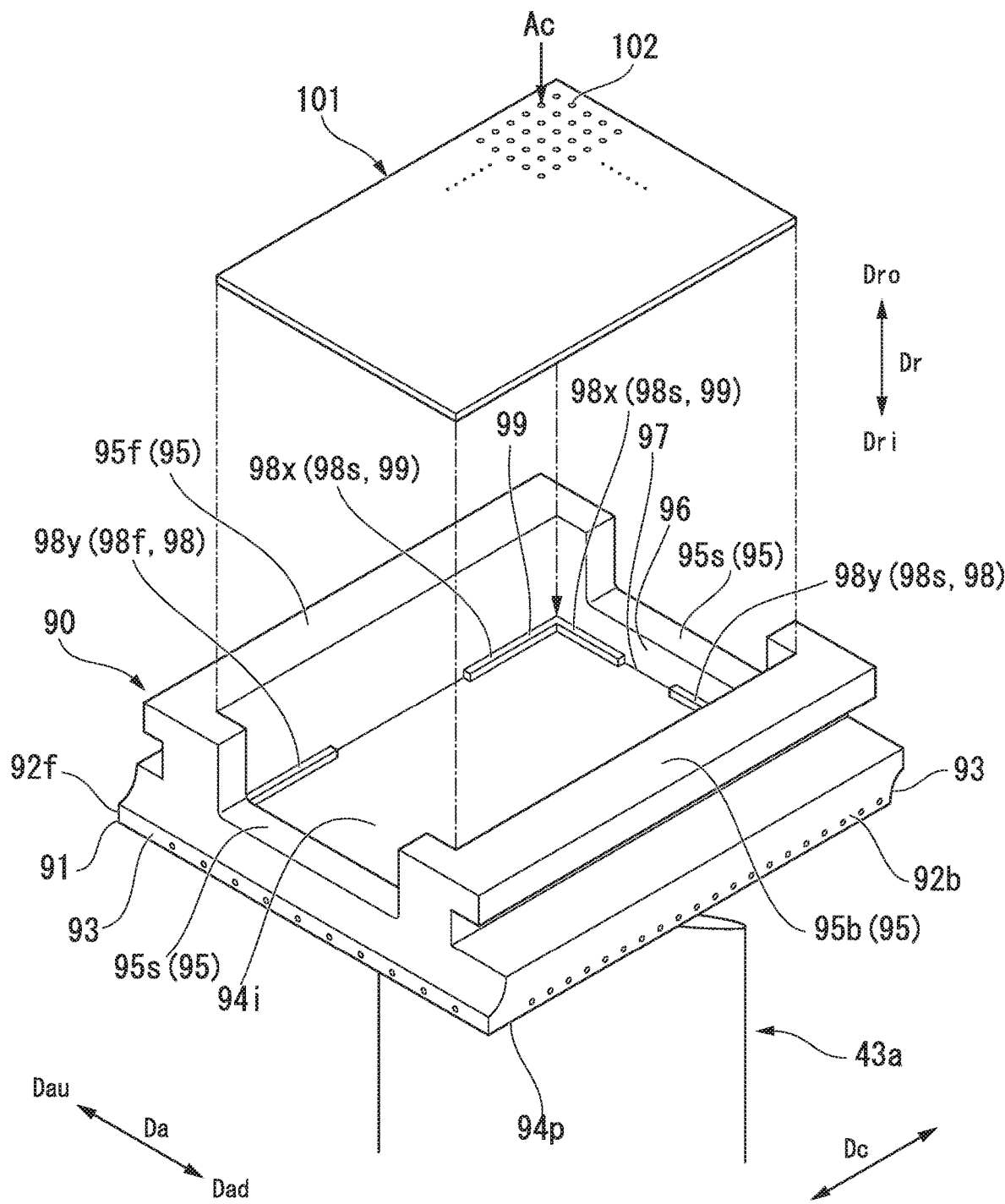
FIG. 12 is a perspective view of a ring segment in an embodiment according to the present invention.

As shown in FIG. 12, the ring segment 90 that is a flow passage forming plate has a ring segment main body (plate main body) 91 and a peripheral wall 95. Like the outer shroud main body 61o of the vane 50, the ring segment main body 91 has a front end surface 92f, a back end surface 92b that is an end surface on the downstream side Dad, a pair of circumferential end surfaces 93, a gas path surface 94p, and an inner surface 94i. When seen from the radial direction Dr, the ring segment main body 91 has a rectangular shape or a square shape.

The peripheral wall 95 includes a front wall 95f and a back wall 95b facing each other in the axial direction Da, and a pair of side walls 95s facing each other in the circumferential direction Dc. Each of the front wall 95f and the back wall 95b protrudes, relative to the ring segment main body 91, farther toward the radially outer side Dro than the pair of side walls 95s, and forms a hook. The front wall 95f and the back wall 95b forming the hooks serve to mount the vane 50 on the inner circumferential side of the turbine casing 45. Specifically, the front wall 95f and the back wall 95b forming the hooks are mounted on the isolation ring 45c (see FIG. 2) that constitutes a part of the turbine casing 45. The ring segment 90 has a recess 96 that is formed by the ring segment main body 91 and the peripheral wall 95 and recessed toward the radially inner side Dri.

The ring segment 90 is provided with an impingement plate 101 that partitions a space inside the recess 96 into a region on the radially outer side Dro and an inner cavity 97 that is a region on the radially inner side Dri. The impingement plate 101 has a plurality of through-holes 102 that are formed so as to extend therethrough in the radial direction Dr. Part of the cooling air Ac present on the radially outer side Dro of the ring segment 90 flows into the inner cavity 97 through the through-holes 102 of the impingement plate 101.

The ring segment 90 has a side end passage that leads from the inner cavity 97 to a space on an outer side of a side end surface, and a back end passage that leads from the inner cavity 97 to a space on the downstream side of the back end surface. The cooling air Ac having flowed into the inner cavity 97 flows through the side end passage, the back end passage, etc. to the outside The ring segment 90 is provided with ledges 98 that receive the impingement plate 101. The ledge 98 protrudes along an inner wall surface of the peripheral wall 95, from the inner surface 94i of the ring segment main body 91 toward the radially outer side Dro. Thus, relative to the inner surface 94i of the ring segment main body 91, the ledge 98 protrudes toward the opposite-flow-passage side (Dro) that is the side of the inner surface 94i based on the gas path surface 94p. The ledge 98 has a receiving surface 99 facing the radially outer side Dro.

The ledges 98 include a front ledge 98f that is provided along an inner wall surface of the front wall 95f, a back ledge (not shown) that is provided along an inner wall surface of the back wall 95b, and side ledges 98s that are provided respectively along inner wall surfaces of the pair of side walls 95s Each of the front ledge 98*f* and the back ledge (not shown) includes a first ledge 98*x* and a second ledge 98*y*. Each of the first ledge 98*x* and the second ledge 98*y* of the front ledge 98*f* protrudes from the inner wall surface of the front wall 95*f* toward the back wall 95*b*, and protrudes from the inner surface 94*i* of the ring segment main body 91 toward the radially outer side Dro. Each of the first ledge 98*x* and the second ledge 98*y* extends in a front wall extension direction in which the front wall 95*f* extends. This front wall extension direction is the circumferential direction Dc. The first ledge 98*x* of the front ledge 98*f* extends from the inner wall surface of the one side wall 95*s* toward the other side wall 95*s*. The second ledge 98*y* of the front ledge 98*f* extends from the inner wall surface of the other side wall 95*s* toward the one side wall 95*s*. The first ledge 98*x* and the second ledge 98*y* of the front ledge 98*f* are separated from each other in the front wall extension direction. Thus, the ledge 98 is not provided between the first ledge 98*x* and the second ledge 98*y* of the front ledge 98*f* in the front wall extension direction. The first ledge of the back ledge (not shown) has the same configuration as the first ledge 98*x* of the front ledge 98*f*, and the second ledge of the back ledge has the same configuration as the second ledge 98*y* of the front ledge 98*f*. Specifically, each of the first ledge and the second ledge of the back ledge protrudes from the inner wall surface of the back wall 95*b* toward the front wall 95*f*, and protrudes from the inner surface 94*i* of the ring segment main body 91 toward the radially outer side Dro. Each of the first ledge and the second ledge of the back ledge extends in a back wall extension direction in which the back wall 95*b* extends. This back wall extension direction is the circumferential direction Dc. The first ledge of the back ledge extends from the inner wall surface of the one side wall 95*s* toward the other side wall 95*s*. The second ledge of the back ledge extends from the inner wall surface of the other side wall 95*s* toward the one side wall 95*s*. The first ledge and the second ledge of the back ledge are separated from each other in the back wall extension direction. Thus, the ledge 98 is not provided between the first ledge and the second ledge in the back wall in the back wall extension direction.

Each of the pair of side ledges 98*s* includes a first ledge 98*x* and a second ledge 98*y*. The first ledge 98*x* of one side ledge 98*s* of the pair of side ledges 98*s* and the first ledge 98*x* of the other side ledge 98*s* have basically the same configuration. The second ledge 98*y* of one side ledge 98*s* of the pair of side ledges 98*s* and the second ledge 98*y* of the other side ledge 98*s* have basically the same configuration. Each of the first ledge 98*x* and the second ledge 98*y* of one side ledge 98*s* protrudes from the inner wall surface of one side wall 95*s* toward the other side wall 95*s*, and protrudes from the inner surface 94*i* of the ring segment main body 91 toward the radially outer side Dro. Each of the first ledge 98*x* and the second ledge 98*y* extends in a side wall extension direction in which the side wall 95*s* extends. The first ledge 98*x* extends from the inner wall surface of the front wall 95*f* toward the back wall 95*b*. The second ledge 98*y* extends from the inner wall surface of the back wall 95*b* toward the front wall 95*f*. The first ledge 98*x* and the second ledge 98*y* are separated from each other in the side wall extension direction. Thus, the ledge 98 is not provided between the first ledge 98*x* and the second ledge 98*y* in the side wall extension direction.

Like the impingement plate 81 of the inner shroud 60*i*, the impingement plate 101 comes in contact with a contact region that is a region of the receiving surface 99 of the ledge 98. The impingement plate 101 is fillet-welded to a region of the ring segment 90 where the ledge 98 is provided, on a region of the receiving surface 99 except for the contact region, in a state where the impingement plate 101 is in contact only with the contact region of the receiving surface 99. Thus, a welded part is formed between a peripheral edge of the impingement plate 101 and the receiving surface 99. Moreover, the impingement plate 101 is butt-welded at a peripheral edge thereof to the region of the reign segment 90 where the ledge 98 is not provided, on the inner wall surface of the peripheral wall 95. Thus, a welded part is formed between the peripheral edge of the impingement plate 101 and the inner wall surface of the peripheral wall 95.

Part of the cooling air Ac present on the radially outer side Dro of the vane 50 is supplied from inside the intermediate casing 14. This part of the cooling air Ac flows into the inner cavity 67 of the outer shroud 60*o* through the through-holes 82 formed in the impingement plate 81 of the outer shroud 60*o*. In this process, the cooling air Ac impinges on a surface of the member forming the inner cavity 67, specifically, the inner surface 64*i* of the outer shroud main body 61*o*, and impingement-cools the inner surface 64*i*. As a result, the gas path surface 64*p* facing the inner surface 64*i* is cooled by the cooling air Ac.

Part of the cooling air Ac having flowed into the inner cavity 67 of the outer shroud 60*o* flows into the pressure-side passage 78*p* and the suction-side passage 78*n* communicating with the inner cavity 67. The cooling air Ac having flowed into the pressure-side passage 78*p* cools a part of the gas path surface 64*p* of the outer shroud main body 61*o* on the circumferential pressure side Dcp, and the pressure-side end surface 63*p* of the outer shroud main body 61*o* in the process of passing through the pressure-side passage 78*p*. This cooling air Ac flows out from the back end surface 62*b* of the outer shroud main body 61*o* toward the downstream side. The cooling air Ac having flowed into the suction-side passage 78*n* cools a part of the gas path surface 64*p* of the outer shroud main body 61*o* on the circumferential suction side Dcn, and the suction-side end surface 63*n* of the outer shroud main body 61*o* in the process of passing through the suction-side passage 78*n*. This cooling air Ac flows out from the back end surface 62*b* of the outer shroud main body 61*o* toward the downstream side. Another part of the cooling air Ac having flowed into the inner cavity 67 flows into the back end surface blow-out passages 79 communicating with the inner cavity 67. The cooling air Ac having flowed into the back end surface blow-out passages 79 cools a part of the gas path surface 64*p* of the outer shroud main body 61*o* on the downstream side Dad in the process of passing through the back end surface blow-out passages 79. This cooling air Ac flows out from the back end surface 62*b* of the outer shroud main body 61*o* toward the downstream side.

Another part of the cooling air Ac present on the radially outer side Dro of the vane 50 flows into the vane air passage 75 of the plurality of vane air passages 75 that is open at the end on the radially outer side Dro. The cooling air Ac having flowed into the vane air passage 75 convectively cools the vane body 51 in the process of flowing through the vane air passage 75. The cooling air Ac having flowed into the vane air passage 75 flows out into the combustion gas flow passage 49 through the vane surface blow-out passages 77 communicating with this vane air passage 75. Thus, the leading edge 52 and the trailing edge 53 of the vane body 51 are cooled in the process of the cooling air Ac flowing out of the vane surface blow-out passages 77. Moreover, part of the cooling air Ac having flowed out of the vane surface blow-out passages 77 into the combustion gas flow passage 49 film-cools the vane body 51 by partially covering the surface of the vane body 51.

Part of the cooling air Ac present on the radially inner side Dri of the vane 50 is supplied from inside the intermediate casing 14. This part of the cooling air Ac flows into the inner cavity 67 of the inner shroud 60i through the through-holes 82 formed in the impingement plate 81 of the inner shroud 60i. In this process, the cooling air Ac impinges on a surface of the member forming the inner cavity 67, specifically, the inner surface 64i of the inner shroud main body 61i, and impingement-cools the inner surface 64i. As a result, the gas path surface 64p facing the inner surface 64i is cooled by the cooling air Ac.

Part of the cooling air Ac having flowed into the inner cavity 67 of the inner shroud 60i flows into the pressure-side passage 78p and the suction-side passage 78n communicating with the inner cavity 67. The cooling air Ac having flowed into the pressure-side passage 78p cools a part of the gas path surface 64p of the inner shroud main body 61i on the circumferential pressure side Dcp, and the pressure-side end surface 63p of the inner shroud main body 61i in the process of passing through the pressure-side passage 78p. This cooling air Ac flows out from the back end surface 62b of the inner shroud main body 61i toward the downstream side. The cooling air Ac having flowed into the suction-side passage 78n cools a part of the gas path surface 64p of the inner shroud main body 61i on the circumferential suction side Dcn, and the suction-side end surface 63n of the inner shroud main body 61i in the process of passing through the suction-side passage 78n. This cooling air Ac flows out from the back end surface 62b of the inner shroud main body 61i toward the downstream side. Another part of the cooling air Ac having flowed into the inner cavity 67 flows into the back end surface blow-out passages 79 communicating with the inner cavity 67. The cooling air Ac having flowed into the back end surface blow-out passages 79 cools a part of the gas path surface 64p of the inner shroud main body 61i on the downstream side Dad in the process of passing through the back end surface blow-out passages 79. This cooling air Ac flows out from the back end surface 62b of the inner shroud main body 61i toward the downstream side.

Here, the ledges 71 that receive the impingement plates 81 of the inner shroud 60i and the outer shroud 60o in this embodiment are formed not along the entire inner wall surfaces of the peripheral walls 65i, 65o of the shrouds 60i, 60o, but are formed along only parts of the inner wall surfaces of the peripheral walls 65i, 65o. Thus, the ledge 71 is not provided in parts of the inner wall surfaces of the peripheral walls 65i, 65o. Accordingly, the through-holes 82 of the impingement plates 81 can be formed close to the inner wall surfaces of the peripheral walls 65i, 65o so that the inner wall surfaces of the peripheral walls 65i, 65o, and moreover parts of the inner surfaces 64i of the shroud main bodies 61i, 61o close to the inner wall surfaces of the peripheral walls 65i, 65o can be effectively cooled with the cooling air Ac flowing through these through-holes 82 into the inner cavities 67. As a result, outer wall surfaces of the peripheral walls 65i, 65o, and moreover the parts of the gas path surfaces 64p along the peripheral walls 65i, 65o can be effectively cooled. Moreover, in the parts where the ledge 71 is not provided, the walls between the inner cavity 67 and an outer space on the opposite side based on these parts have a smaller thickness, so that the heat capacity of these parts can be reduced compared with the parts where the ledge 71 is provided. In this respect, too, the shrouds 60i, 60o can be effectively cooled in this embodiment.

The high-temperature combustion gas G hits the leading edge 52 of the vane body 51 of the vane 50. As a result, the coefficient of heat transfer between the leading edge 52 and the combustion gas G increases, and the leading edge 52 is more easily heated by the combustion gas G than the pressure-side surface 55 or the suction-side surface 4 of the vane body 51. Accordingly, regions of the gas path surfaces 64p of the shrouds 60i, 60o in the vicinity of the leading edge 52 of the vane body 51 are also easily heated by the combustion gas G. Moreover, the distance between the leading edge 52 of the vane body 51 and an inner circumferential surface of the front wall 65f in the axial direction Da is short. Thus, it is difficult to provide the through-holes 82 of the impingement plate 81 in this space, and it is difficult to cool this space with the cooling air Ac. In this embodiment, however, the ledge 71 is not provided in the region where the leading edge 52 of the vane body 51 is located in the front wall extension direction in which the front wall 65f extends. Thus, the regions of the shrouds 60i, 60o that are easily heated and not easily cooled can be cooled in this embodiment.

The distance in the circumferential direction Dc between a part of the suction-side surface 54 of the vane body 51 that is located farthest on the circumferential suction side Dcn and the inner wall surface of the suction-side wall 65n is also short. Thus, it is difficult to provide the through-holes 82 of the impingement plate 81 in this space, and it is difficult to cool this space with the cooling air Ac. In this embodiment, however, the ledge 71 is not provided in the region of the suction-side surface of the vane body 51 that is located farthest on the circumferential suction side Dcn in the suction-side wall extension direction in which the suction-side wall 65n extends. Thus, the regions of the shrouds 60i, 60o that are not easily cooled can be cooled in this embodiment.

The ledges 98 that receive the impingement plate 101 of the ring segment 90 of this embodiment are also formed not along the entire inner wall surface of the peripheral wall 95 of the ring segment 90, but is formed along only a part of the inner wall surface of the peripheral wall 95. Thus, the ledge 98 is not provided in a part of the inner wall surface of the peripheral wall 95. Accordingly, the through-holes 102 of the impingement plate 101 can be formed close to the inner wall surface of the peripheral wall 95 so that, as with the shrouds 60i, 60o described above, the ring segment 90 can be effectively cooled with the cooling air Ac flowing through these through-holes 102 into the inner cavity 97.

Thus, in this embodiment, it is possible to enhance the cooling effect of the cooling air Ac on the shrouds 60i, 60o of the vane 50 and the ring segment 90 that are flow passage forming plates.

Next, further advantages of this embodiment will be described with reference to FIG. 18.

FIG. 18(A) shows the embodiment in which the impingement plate 81 is mounted on the ledges 71. FIG. 18(B) and FIG. 18(C) respectively show Comparative Examples 1 and 2 in which the ledge is not provided and the impingement plate 81 is mounted directly on the inner wall surfaces of the peripheral walls 65i, 65o.

To impingement-cool the inner surface 64i of the shroud 60i or 60o with the cooling air Ac, it is necessary to set the distance between the inner surface 64i of the shroud 60i or 60o and the impingement plate 81 to an appropriate distance H1 along the entire inner cavity 67 as shown in FIG. 18(A). In the embodiment shown in FIG. 18(A), the distance between the inner surface 64i of the shroud 60i or 60o and the impingement plate 81 can be set to the distance H1 with ease and high accuracy along the entire inner cavity 67, by setting the distance between the inner surface 64i of the shroud 60i or 60o and the receiving surface 72 of the ledge 71 substantially to the distance H1. In this embodiment, it is possible to set the distance from the inner surface 64$i$ of the shroud 60$i$ or 60$o$ to the receiving surface 72 to the distance H1 with very high accuracy, for example, by machining the surface of the ledge 71 constituting the receiving surface 72.

In this embodiment, as described above, the impingement plate 81 is fillet-welded to the region of the shroud 60$i$ or 60$o$ where the ledge 71 is provided, on the region of the receiving surface 72 except for the contact region 72$a$, in the state where the impingement plate 81 is in contact only with the contact region 72$a$ of the receiving surface 72. The welded part 81$w$ formed by this fillet welding is formed at a region of the receiving surface 72, on the side of the peripheral wall 65$i$ or 65$o$ that is the opposite side of the contact region 72$a$ from an end on the side of the inner cavity 67. The through-holes 82 formed in the impingement plate 81 can be formed at any positions except for the region of the impingement plate 81 that comes in contact with the receiving surface 72 of the ledge 71. Thus, the through-holes 82 can be formed at positions in the vicinity of the region of the impingement plate 81 that comes in contact with the receiving surface 72 of the ledge 71, in other words, at positions in the vicinity of the inner wall surface of the ledge 71 facing the inner cavity 67.

As has been described above, in this embodiment, the distances between the inner surfaces 64$i$ of the shrouds 60$i$, 60$o$ and the impingement plates 81 can be set to the distance H1 with high accuracy along the entire inner cavities 67, so that the inner surfaces 64$i$ of the shrouds 60$i$, 60$o$ can be effectively impingement-cooled. Moreover, in this embodiment, the through-holes 82 can be formed at positions of the impingement plates 81 in the vicinity of the inner wall surfaces of the ledges 71 facing the inner cavities 67, and the impingement plates 81 are welded at positions farther on the side of the inner wall surfaces of the peripheral walls 65$i$, 65$o$ than the inner wall surfaces of the ledges 71. Thus, the inner wall surfaces of the ledges 71 can also be effectively cooled. Furthermore, in this embodiment, it is possible to easily fix the impingement plates 81 at such positions that the distances from the inner surfaces 64$i$ of the shrouds 60$i$, 60$o$ are the appropriate distance H1, by welding the impingement plates 81 to the shrouds 60$i$, 60$o$ in the state where the impingement plates 81 are in contact with the receiving surfaces 72 of the ledges 71.

An impingement plate 81$x$ in Comparative Example 1 shown in FIG. 18(B) has an impingement plate main body 81$xa$ and a flange plate 81$xb$ that is formed on an outer peripheral edge of the impingement plate main body 81$xa$. The impingement plate main body 81$xa$ faces the inner surface 64$i$ of the shroud 60$i$ or 60$o$. The flange plate 81$xb$ extends from the outer peripheral edge of the impingement plate main body 81$xa$ in a direction substantially perpendicular to a direction in which the impingement plate main body 81$xa$ extends. For example, the impingement plate 81$x$ is formed by bending an outer peripheral portion of a plate at a substantially right angle. The impingement plate 81$x$ is fixed to the shroud 60$i$ or 60$o$ by being fillet-welded at a leading end of the flange plate 81$xb$ to the inner wall surface of the peripheral wall 65$i$ or 65$o$, in a state where the flange plate 81$xb$ is in contact with the inner wall surface of the peripheral wall 65$i$ or 65$o$. Thus, in this Comparative Example 1, a welded part 81$xw$ is formed between the leading end of the flange plate 81$xb$ and the inner wall surface of the peripheral wall 65$i$ or 65$o$.

In Comparative Example 1, it is difficult to set the distance between the inner surface 64$i$ of the shroud 60$i$ or 60$o$ and the impingement plate 81$x$ to the appropriate distance H1. In Comparative Example 1, it is difficult to maintain the distance from the inner surface 64$i$ of the shroud 60$i$ or 60$o$ at the appropriate distance H1 during welding. Thus, for example, one possible method is to place a jig, such as a spacer, on the inner surface 64$i$ of the shroud 60$i$ or 60$o$ and place the impingement plate 81$x$ on this jig, and weld the impingement plate 81$x$ to the shroud 60$i$ or 60$o$ in this state. In this method, the jig remaining inside the inner cavity 67 after the impingement plate 81$x$ is welded cannot be taken out. To take out the jig, it is necessary to provide a take-out opening in the impingement plate 81$x$, which makes the structure of the impingement plate 81$x$ complicated. For example, another possible method is to hold the impingement plate 81$x$ with some jig so that the distance from the inner surface 64$i$ of the shroud 60$i$ or 60$o$ to the leading end of the flange plate 81$xb$ is a distance H2, and weld the impingement plate 81$x$ to the shroud 60$i$ or 60$o$ in this state. This method also requires using a jig. Moreover, the leading end of the flange plate 81$xb$ needs to be finished flat by machining. In Comparative Example 1, the through-holes 82 cannot be formed in the flange plate 81$xb$ of the impingement plate 81$x$ that comes in contact with the inner wall surface of the peripheral wall 65$i$ or 65$o$, or at positions of the impingement plate main body 81$xa$ in the vicinity of the flange plate 81$xb$, which is disadvantageous in cooling the inner wall surface of the peripheral wall 65$i$ or 65$o$. Moreover, in Comparative Example 1, producing the impingement plate 81$x$ requires bending the outer peripheral portion of a plate at a substantially right angle.

Like the impingement plate 81 of the embodiment, an impingement plate 81$y$ of Comparative Example 2 shown in FIG. 18(C) is produced by forming the through-holes 82 in a flat plate. The impingement plate 81$y$ is fixed to the shroud 60$i$ or 60$o$ by being welded at an outer peripheral edge thereof to the inner wall surface of the peripheral wall 65$i$ or 65$o$, in a state where the outer peripheral edge of the impingement plate 81 is butted against the inner wall surface of the peripheral wall 65$i$ or 65$o$. Thus, in Comparative Example 2, a welded part 81$yw$ is formed between the outer peripheral edge of the impingement plate 81$y$ and the inner wall surface of the peripheral wall 65$i$ or 65$o$.

In Comparative Example 2, as in Comparative Example 1, it is difficult to set the distance between the inner surface 64$i$ of the shroud 60$i$ or 60$o$ and the impingement plate 81$y$ to the appropriate distance H1. Moreover, in Comparative Example 2, the welded part 81$yw$ is formed between the outer peripheral edge of the impingement plate 81$y$ and the inner wall surface of the peripheral wall 65$i$ or 65$o$. Accordingly, the through-holes 82 cannot be formed in a part of the impingement plate 81$y$ close to the outer peripheral edge, which is disadvantageous in cooling the inner wall surface of the peripheral wall 65$i$ or 65$o$.

As has been described above, the structure of the embodiment has advantages over the structures of Comparative Examples 1 and 2 in terms of the ease of fixation of the impingement plate 81 and the accuracy of positioning of the impingement plate 81. Moreover, the structure of the embodiment has advantages over the structures of Comparative Examples 1 and 2 in terms of cooling of the inner wall surfaces, too.

Even in the case where the ledge 71 is not provided along one wall constituting a part of the peripheral wall 65$i$ or 65$o$, it is possible to fix the impingement plate 81 to the shroud 60$i$ or 60$o$ with ease and high accuracy, if the ledge 71 is provided along other walls that are joined to the wall at that position. For example, even when the ledge 71 is not provided along the front wall 65$f$ that constitutes a part of the peripheral wall 65i or 65o, it is possible to fix the impingement plate 81 to the shroud 60i or 60o with ease and high accuracy, if the ledge 71 is provided along the side walls 65p, 65n that are joined to the front wall 65f.

Figure 13:
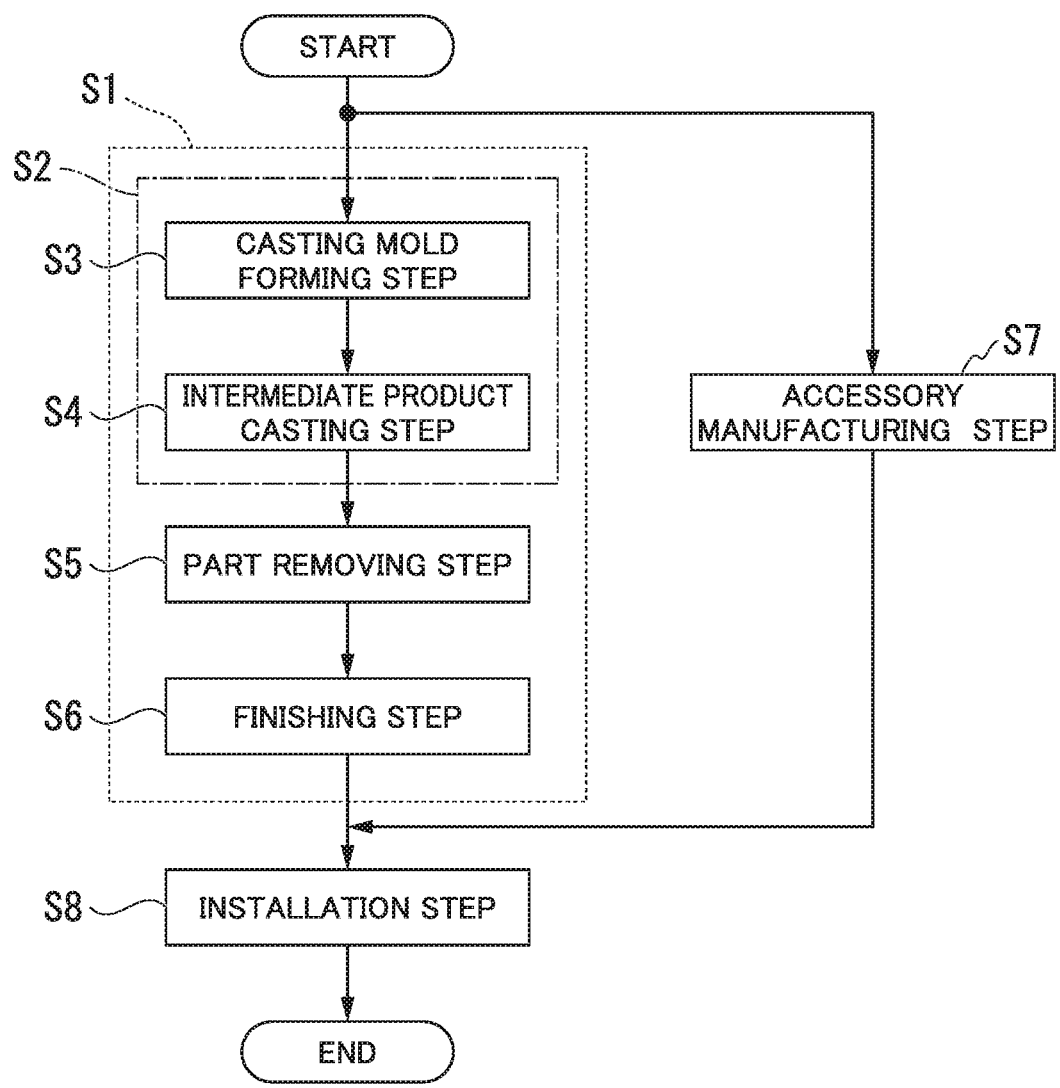
FIG. 13 is a flowchart showing a vane manufacturing method in the embodiment according to the present invention.

Next, a manufacturing method of the vane 50 having been described above will be described in accordance with the flowchart shown in FIG. 13.

First, the vane main body is formed (S1: main body forming step). The vane main body has a part among the parts composing the vane 50 that does not include accessories such as the impingement plate 81.

In parallel with this main body forming step (S1), or before or after the main body forming step (S1), the accessories are manufactured (S7: accessory manufacturing step). The accessories include, other than the impingement plate 81 mentioned above, the cap 84 that closes the end opening of the vane air passage 75, an insert that is inserted as necessary into the vane air passage 75, and the seal plate 83.

In the main body forming step (S1), first, an intermediate product of the vane main body is formed by casting (S2: intermediate product forming step). In this intermediate product forming step (S2), a casting mold forming step (S3) and an intermediate product casting step (S4) are performed.

In the casting mold forming step (S3), a casting mold having an internal space matching the outer shape of the intermediate product, and as necessary, a vane air passage core having an outer shape matching the shape of the vane air passage 75 are formed. For example, the vane air passage core is made of ceramic.

In the intermediate product casting step (S4), the vane air passage core is disposed inside the casting mold, and molten metal is poured into the casting mold. For example, the molten metal is a melt of nickel-base alloy etc. having high heat resistance. When the molten metal poured into the casting mold has hardened, the ceramic vane air passage core is melted in an alkaline solution.

This concludes the intermediate product forming step (S2), and an intermediate product of the vane main body has been completed. This intermediate product has parts that constitute the vane body 51 and the shrouds 60i, 60o as the flow passage forming plates. Moreover, this intermediate product has the ledges 71 for receiving the impingement plate 81, formed along the entire inner wall surfaces of the peripheral walls 65i, 65o of the shrouds 60i, 60o.

When the intermediate product forming step (S2) is concluded, a part of the ledge 71 of each of the shrouds 60i, 60o is removed (S5: part removing step). A part of the ledge 71 is removed by an existing method, for example, machining, electric discharge machining, or electro-chemical machining. In this part removing step (S5), of the ledge 71 extending in the front wall extension direction along the front wall 65f of each of the shrouds 60i, 60o, an intermediate part of the ledge 71 in the front wall extension direction is removed. As a result, the first front ledge 71f1 and the second front ledge 71f2 separated from each other in the front wall extension direction are formed in each of the shrouds 60i, 60o. Moreover, of the ledge 71 extending in the suction-side wall extension direction along the suction-side wall 65n of each of the shrouds 60i, 60o, an intermediate part of the ledge 71 in the suction-side wall extension direction is removed. As a result, the first suction-side ledge 71n1 and the second suction-side ledge 71n2 separated from each other in the suction-side wall extension direction are formed in each of the shrouds 60i, 60o.

Next, a finishing process is performed on the intermediate product from which a part of the ledge 71 has been removed, and thus the vane main body including the shrouds 60i, 60o being the flow passage forming plates is completed (S6: finishing step). In the finishing step (S6), for example, an outer surface of the intermediate product is polished. Moreover, flow passages that are not yet formed in the intermediate product are formed in the vane body 51 and the shrouds 60i, 60o of the intermediate product by an existing method such as machining or electric discharge machining. In addition, a thermal barrier coating is applied to the outer surface of the intermediate product as necessary.

This concludes the main body forming step (S1).

When the main body forming step (S1) and the accessory manufacturing step (S7) are concluded, the accessories are installed to the vane main body (S8: installation step). In this installation step (S8), the cap 84 for closing the end opening of the vane air passage 75, the insert, etc. are mounted to the vane main body. Moreover, the impingement plate 81, the seal plate 83, etc. are mounted to the vane main body. These accessories are mounted by welding, for example.

Thus, the vane (flow passage forming member assembly) has been completed.

However, the vane 50 of this embodiment can also be manufactured without performing the above manufacturing method. Specifically, in the intermediate product forming step (S2), an intermediate product is formed in which the ledge 71 is formed along only a part of each of the inner wall surfaces of the peripheral walls 65i, 65o of the shrouds 60i, 60o. In this case, in the casting mold forming step (S3), a casting mold having an internal space matching the outer shape of this intermediate product is formed. Thus, the part removing step (S5) is omitted if the intermediate product having the ledge 71 formed along only a part of each of the inner wall surfaces of the peripheral walls 65i 65o of the shrouds 60i, 60o is formed.

Although the above method is a vane manufacturing method, the ring segment 90 as the flow passage forming member assembly can also be manufactured by the same procedure. Specifically, the ring segment 90 can be manufactured by performing the main body forming step (S2), the part removing step (S5), and the finishing step (S6). When the ring segment 90 is completed, the impingement plate 101 is mounted to the ring segment 90 to complete the ring segment having the impingement plate (flow passage forming plate member assembly).

Figure 14:
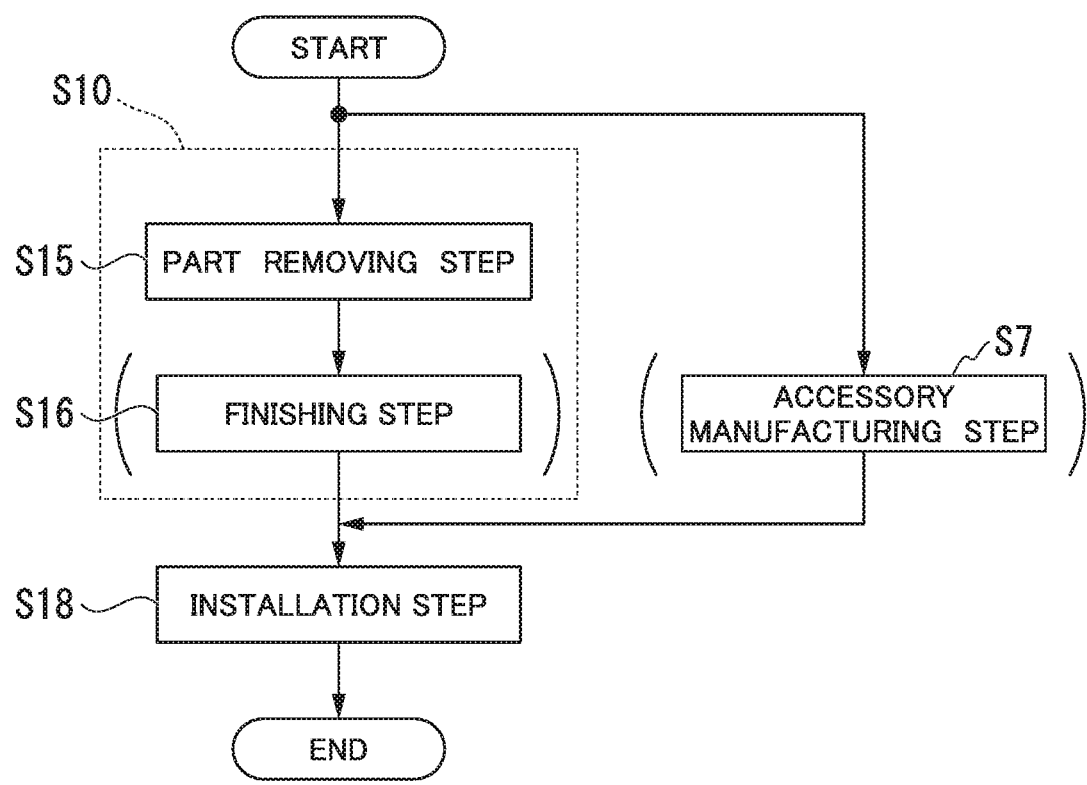
FIG. 14 is a flowchart showing a vane modification method in the embodiment according to the present invention.

Next, a vane modification method will be described according to the flowchart shown in FIG. 14.

The vane to be modified here is a vane having the ledge 71 formed along the entire inner wall surfaces of the peripheral walls 65i, 65o of the shrouds 60i, 60o. The vane to be modified may be an unused vane or a used vane.

First, the vane main body to be modified is modified (S10: modification step). In parallel with this modification step (S10), or before or after the modification step (S10), accessories are manufactured as necessary (S7: accessory manufacturing step).

In the modification step (S10), first, a part of the ledge 71 of each of the shrouds 60i, 60o of the vane main body to be modified is removed (S15: part removing step). The contents of the process in this part removing step (S15) are basically the same as those in the part removing step (S5) of the manufacturing method.

When the part removing step (S15) is concluded, a finishing step (S16) similar to the finishing step (S6) of the manufacturing method is performed as necessary. However, this finishing step (S16) is not required, for example, when an unused vane is modified.

This concludes the modification of the vane main body including the shrouds 60i, 60o that are flow passage forming plates.

When the modification step (S10) and the accessory manufacturing step (S7) are concluded, the accessories are installed to the vane main body (S18: installation step). The contents of the process in this installation step (S18) are basically the same as those in the installation step (S8) of the manufacturing method.

Thus, a modified vane (flow passage forming member assembly) has been completed.

First Modified Example of Vane

Figure 15:
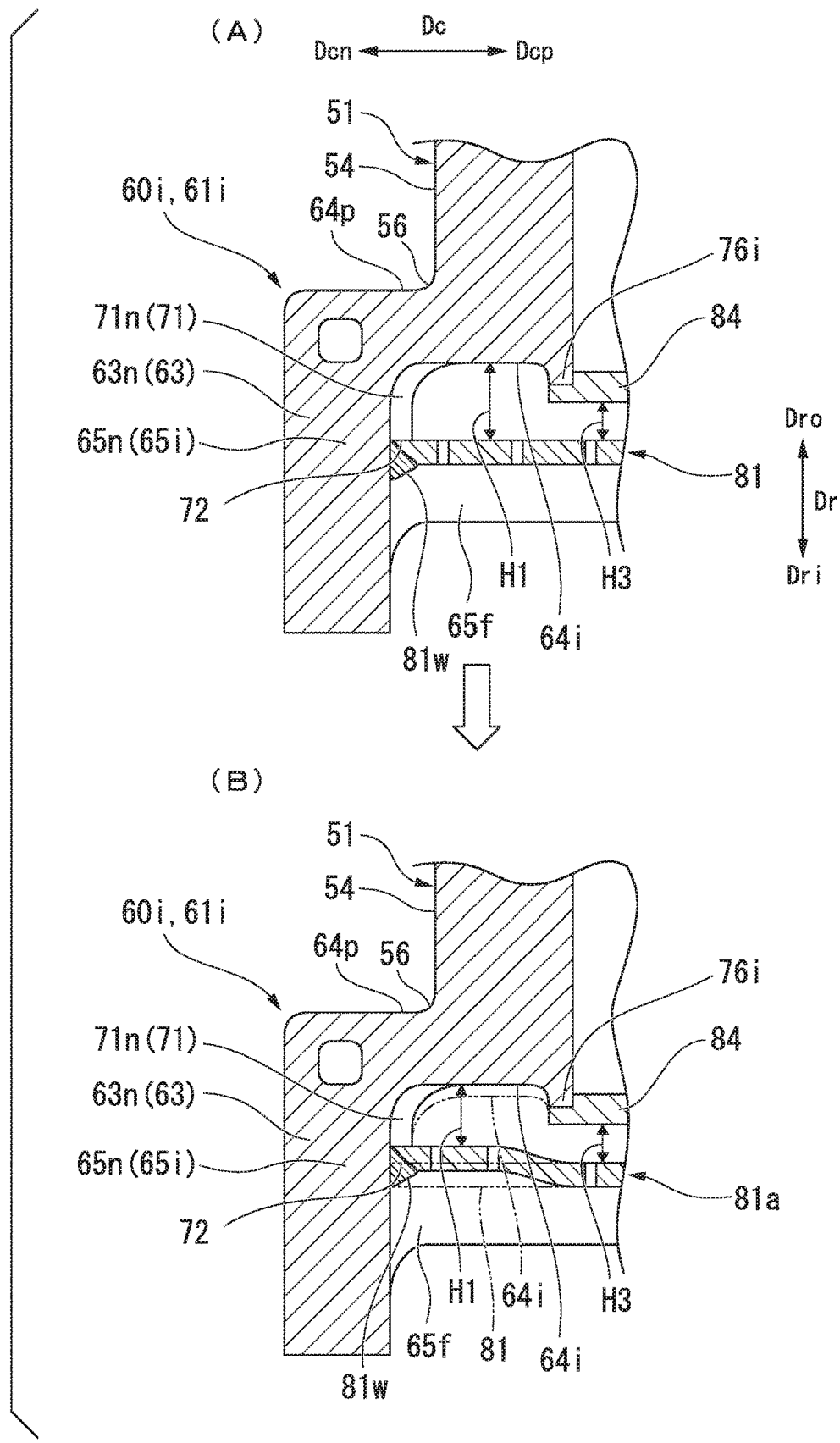

A first modified example of the vane of the above embodiment will be described with reference to FIG. 15.

In the vane of this modified example, the thickness of the inner shroud main body 61i is reduced from the thickness of the inner shroud main body 61i of the above embodiment. Here, the thickness of the inner shroud main body 61i refers to the interval between the gas path surface 64p and the inner surface 64i of the inner shroud main body 61i.

A thinning process for reducing the thickness of the inner shroud main body 61i is performed in the part removing step of the manufacturing method and the modification method of the above embodiment. In this thinning, the side of the inner surface 64i of the inner shroud main body 61i is processed by an existing method, for example, machining, electric discharge machining, or electro-chemical machining, as in removing a part of the ledge 71.

As shown in FIG. 15(A), to impingement-cool the inner surface 64i of the inner shroud main body 61i with the cooling air Ac, it is necessary to set the distance between the inner surface 64i of the inner shroud main body 61i and the impingement plate 81 to the appropriate distance H1. In other words, it is necessary to set the distance between the inner surface 64i of the inner shroud main body 61i and the receiving surface 72 of the ledge 71 to the appropriate distance H1. If the side of the inner surface 64i of the inner shroud main body 61i is machined to reduce the thickness of the inner shroud main body 61i as in this modified example, the distance between the inner surface 64i of the inner shroud main body 61i and the receiving surface 72 of the ledge 71 becomes larger after processing than before processing. It is therefore preferable to perform a process for reducing the height of the ledge 71 along with the thinning process of the inner shroud main body 61i.

As shown in FIG. 15(B), it is also necessary to set the distance between the cap 84 etc. that closes the opening of the vane air passage 75 and the impingement plate 81 to an appropriate distance H3. If the process for reducing the height of the ledge 71 is performed along with the thinning process of the inner shroud main body 61i, the distance between the impingement plate 81 and the gas path surface 64p of the inner shroud main body 61i becomes shorter. As a result, the distance between the cap 84 etc. and the impingement plate 81 becomes shorter. Therefore, the impingement plate 81 is bent so that a part of the impingement plate 81 that faces the cap 84, in other words, a part thereof that faces the inner lip 76i is shifted in a thickness direction of the impingement plate 81 relative to a part of the impingement plate 81 that faces the inner surface 64i after processing. Thus, in this example, an impingement plate 81a is used of which a part facing the inner lip 76i of the vane air passage 75 is shifted in the thickness direction relative to the part facing the inner surface 64i. If the impingement plate 81a is used, the distance between the cap 84 etc. and the impingement plate 81a can be set to the appropriate distance H3.

When the inner shroud main body 61i is thinned as described above, the heat capacity of the inner shroud main body 61i is reduced, so that the inner shroud main body 61i can be effectively cooled with the cooling air Ac.

Although this modified example is an example of thinning the inner shroud main body 61i, the outer shroud main body 61o or the ring segment main body 91 of the above embodiment may also be thinned in the same manner.

Second Modified Example of Vane

A second modified example of the vane of the above embodiment will be described with reference to FIG. 16.

In the vane 50 of the above embodiment, each of the back ledges 71b extending along the back walls 65b of the shrouds 60i, 60o extends from the suction-side wall 65n of the shroud 60i or 60o to the pressure-side wall 65p thereof.

Figure 16:
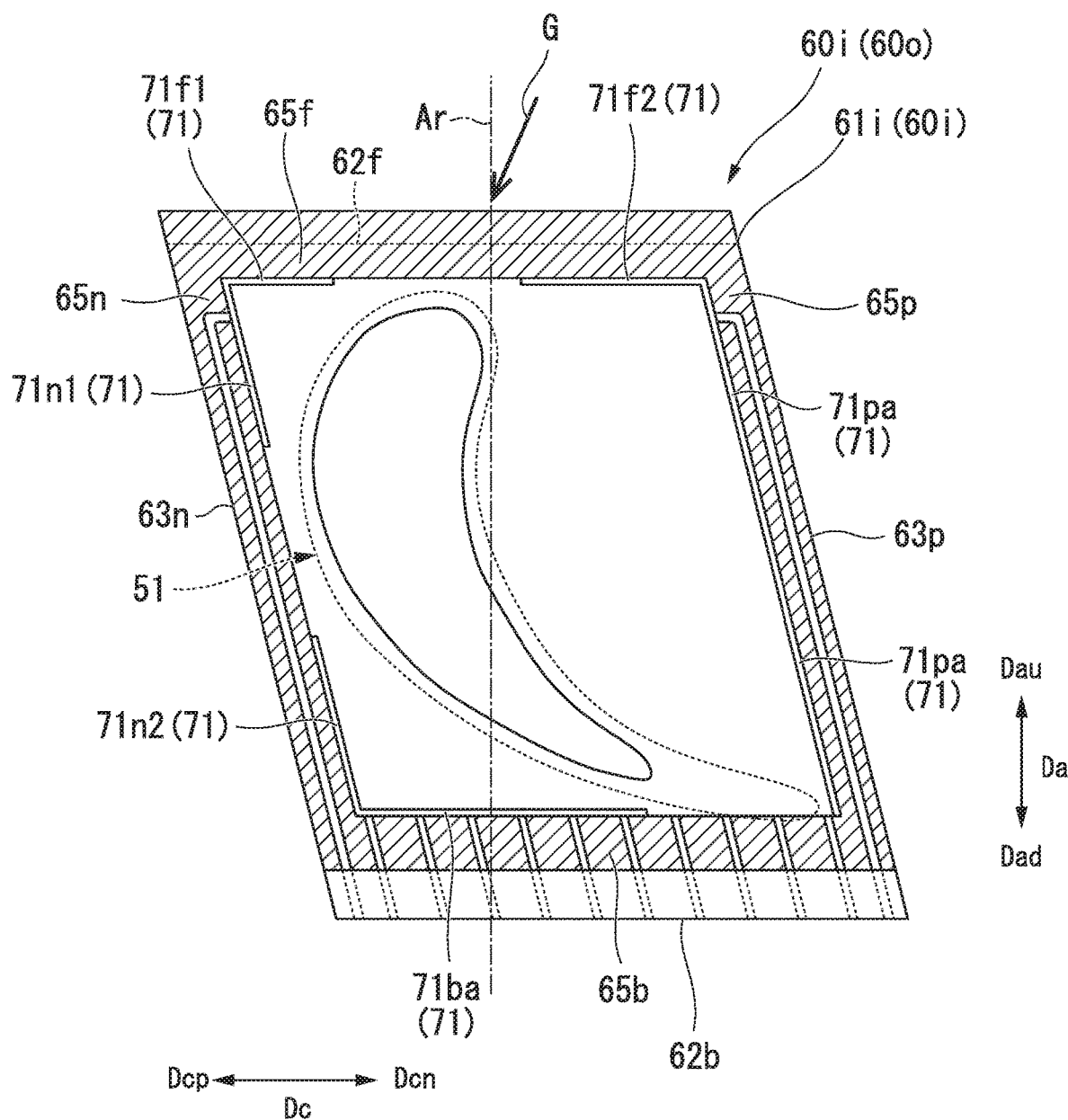
FIG. 16 is a cutaway plan view of main parts of an inner shroud of a vane in a second modified example of the embodiment according to the present invention.

However, as in the second modified example shown in FIG. 16, a back ledge 71ba extending along the back wall 65b of the shroud 60i or 60o may extend from the suction-side wall 65n of the shroud 60i or 60o only to a point short of the pressure-side wall 65p. Thus, the ledge 71 does not need to extend from one wall to the other wall of a pair of walls facing each other.

In the vane of the above embodiment, the number of the ledges 71 provided along one wall constituting a part of the peripheral wall 65i or 65o is two at the most. Moreover, both the two ledges 71 extend from other walls joined to one wall. For example, the first front ledge 71f1 and the second front ledge 71f2 provided along the front wall 65f extend respectively from the side walls 65n, 65p joined to the front wall 65f.

However, three or more ledges 71 may be provided along one wall constituting a part of the peripheral wall 65i or 65o. Moreover, the ledges 71 do not need to extend from other walls joined to one wall.

As has been described above, if a region where the ledge 71 is not provided is appropriately provided, this region where the ledge 71 is not provided can be more effectively cooled with the cooling air Ac. In particular, in the modified example shown in FIG. 16, a region of the fillet 56 formed on the outer circumference of the vane body 51 that is located in the vicinity of the back wall 65b is a region where the ledge 71 is not provided. Thus, in the modified example shown in FIG. 16, cooling of the region of the fillet 56 in the vicinity of the back wall 65b is enhanced.

Third Modified Example of Vane

Figure 17:
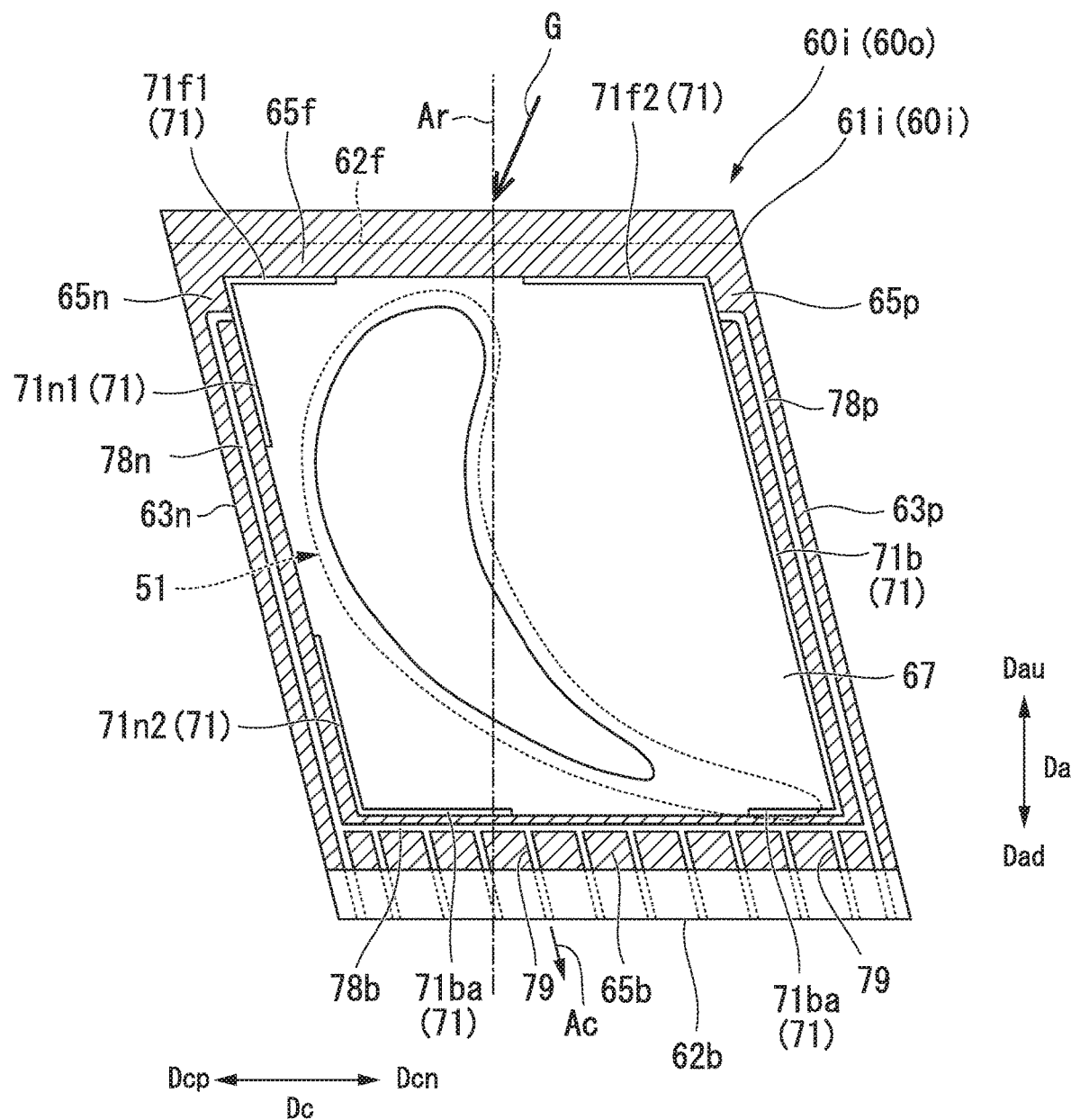
FIG. 17 is a cutaway plan view of main parts of an inner shroud of a vane in a third modified example of the embodiment according to the present invention.

A third modified example of the vane of the above embodiment will be described with reference to FIG. 17.

In the vane 50 of the above embodiment, the plurality of back end surface blow-out passages 79 that extend from the inner cavity 67 toward the back end surface 62b of the inner shroud main body 61i are formed. The plurality of back end surface blow-out passages 79 communicate at the upstream ends with the inner cavity 67.

However, in some cases it is not possible to allow the back end surface blow-out passages 79 to communicate with the inner cavity 67. In such a case, a back-side passage 78b that provides communication between the suction-side passage 78n and the pressure-side passage 78p may be formed in the back wall 65b, and the plurality of back end surface blow-out passages 79 extending from the back-side passage 78b toward the back end surface 62b of the shroud main body 61i or 61o may be formed. The plurality of back end surface blow-out passages 79 communicate at the upstream ends with the back-side passage 78b. The back end surface blow-out passages 79 are open at the downstream ends in the back end surface 62b of the shroud main body 61i or 61o.

In this modified example, the back wall 65b is convectively cooled by the cooling air Ac flowing through the back end surface blow-out passages 79, and the back wall 65b is convectively cooled by the cooling air Ac flowing through the back-side passage 78b. Thus, in this modified example, cooling of a back-side part of each of the shrouds 60i, 60o is enhanced.

Moreover, in this modified example, a plurality of back ledges 71ba, 71ba that are separated from each other are provided along the inner wall surface of the back wall 65b to enhance cooling of the space between the plurality of back ledges 71ba, 71ba. Thus, cooling of the back-side part of each of the shrouds 60i, 60o is further enhanced.

Although the second and third modified examples are modified examples of the shrouds 60i, 60o of the vane, the ring segment 90 of the above embodiment may also be modified in the same manner.

INDUSTRIAL APPLICABILITY

According to an aspect of the present invention, it is possible to enhance the cooling effect of cooling air on flow passage forming plates.

REFERENCE SIGNS LIST

10 Gas turbine
11 Gas turbine rotor
15 Gas turbine casing
20 Compressor
21 Compressor rotor
25 Compressor casing
30 Combustor
40 Turbine
41 Turbine rotor
42 Rotor shaft
43 Blade row
43a Blade
43b Blade body
43p Platform
43r Blade root
45 Turbine casing
45a Outer casing
45b Inner casing
45c Isolation ring
46 Vane row
50 Vane
51 Vane body
52 Leading edge
53 Trailing edge
54 Suction-side surface
55 Pressure-side surface
56 Fillet
60i Inner shroud (flow passage forming plate)
60o Outer shroud (flow passage forming plate)
61i Inner shroud main body (plate main body)
61o Outer shroud main body (plate main body)
62f Front end surface
62b Back end surface
63 Circumferential end surface
63p Pressure-side end surface
63n Suction-side end surface
64i Inner surface
64p Gas path surface
65i, 65o Peripheral wall
65f Front wall
65b Back wall
65p Pressure-side wall (side wall)
65n Suction-side wall (side wall)
66 Recess
64 Inner cavity
71, 71b Ledge
71f1 First front ledge
71f2 Second front ledge
71b, 71ba Back ledge
71p, 71pa Pressure-side ledge
71n1 First suction-side ledge
71n2 Second suction-side ledge
72 Receiving surface
72a Contact region
75 Vane air passage
75a First vane air passage
75b Second vane air passage
75c Third vane air passage
75d Fourth vane air passage
76i Inner lip
76o Outer lip
77 Vane surface blow-out passage
78n Suction-side passage
78p Pressure-side passage
78b Back-side passage
79 Back end surface blow-out passage
81, 81a, 81x, 81y Impingement plate
81xa Impingement plate main body
81xb Flange plate
81w, 81xw, 81yw Welded part
82 Through-hole
83 Seal plate
84 Cap
85 Retainer
86 Retainer opening
90 Ring segment (flow passage forming plate)
91 Ring segment main body (plate main body)
92f Front end surface
92b Back end surface
93 Circumferential end surface
94i Inner surface
94p Gas path surface
95 Peripheral wall
95f Front wall
95b Back wall
95s Side wall
96 Recess
97 Inner cavity
98 Ledge
98f Front ledge
98b Back ledge
98s Side ledge
98x First ledge
98y Second ledge
99 Receiving surface
101 Impingement plate
102 Through-hole

The invention claimed is:

1. A flow passage forming plate that defines a part of a gas flow passage through which combustion gas flows in a gas turbine, the flow passage forming plate comprising:

a plate main body having a gas path surface that faces a side of the gas flow passage, and an inner surface that faces the opposite side from the gas path surface;
a peripheral wall that is provided along a peripheral edge of the plate main body, and protrudes, relative to the inner surface, toward an opposite-flow-passage side that is a side of the inner surface based on the gas path surface; and
a ledge that protrudes along an inner wall surface of the peripheral wall, from the inner surface toward the opposite-flow-passage side, and receives an impingement plate having a plurality of through-holes, wherein
the flow passage forming plate has the ledge only in a part of the inner wall surface of the peripheral wall in a wall extension direction in which the peripheral wall extends.

2. The flow passage forming plate according to claim 1, wherein the ledge includes a first ledge and a second ledge that are separated from each other in the wall extension direction.

3. A flow passage forming member assembly comprising:
the flow passage forming plate according to claim 1;
the impingement plate that is supported on the ledge of the flow passage forming plate; and
a welded part that connects the flow passage forming plate and the impingement plate to each other.

4. A vane comprising:
the flow passage forming member assembly according to claim 3; and
a vane body that has an airfoil shape, and extends from the gas path surface of the flow passage forming plate toward a flow passage side opposite from the opposite-flow-passage side, wherein
the plate main body has a front end surface that is an end surface on a side of a leading edge of the vane body relative to a trailing edge of the vane body, a back end surface that faces the opposite side from the front end surface, a pressure-side end surface that is an end surface on a side of a pressure-side surface of the vane body relative to a suction-side surface of the vane body, and a suction-side end surface that faces the opposite side from the pressure-side end surface.

5. The vane according to claim 4, comprising a front wall that is a part of the peripheral wall and provided along the front end surface of the plate main body, wherein
the ledge includes a first front ledge and a second front ledge that extend along the front wall and are separated from each other in a front wall extension direction in which the front wall extends, and
the leading edge of the vane body is located between the first front ledge and the second front ledge in the front wall extension direction.

6. The vane according to claim 4, comprising a suction-side wall that is a part of the peripheral wall and provided along the suction-side end surface of the plate main body, wherein
the ledge includes a first suction-side ledge and a second suction-side ledge that extend along the suction-side wall and are separated from each other in a suction-side wall extension direction in which the suction-side wall extends, and
a part of the suction-side surface of the vane body that is closest to the suction-side end surface of the plate main body is located between the first suction-side ledge and the second suction-side ledge in the suction-side wall extension direction.

7. A gas turbine comprising:
the flow passage forming member assembly according to claim 3; and
a combustor that generates the combustion gas by combusting fuel.

8. A gas turbine comprising:
the vane according to claim 4; and
a combustor that generates the combustion gas by combusting fuel.

9. A flow passage forming member assembly comprising:
the flow passage forming plate according to claim 2;
the impingement plate that is supported on the ledge of the flow passage forming plate; and
a welded part that connects the flow passage forming plate and the impingement plate to each other.

10. A vane comprising:
the flow passage forming member assembly according to claim 9; and
a vane body that has an airfoil shape, and extends from the gas path surface of the flow passage forming plate toward a flow passage side opposite from the opposite-flow-passage side, wherein
the plate main body has a front end surface that is an end surface on a side of a leading edge of the vane body relative to a trailing edge of the vane body, a back end surface that faces the opposite side from the front end surface, a pressure-side end surface that is an end surface on a side of a pressure-side surface of the vane body relative to a suction-side surface of the vane body, and a suction-side end surface that faces the opposite side from the pressure-side end surface.

11. The vane according to claim 10, comprising a front wall that is a part of the peripheral wall and provided along the front end surface of the plate main body, wherein
the ledge includes a first front ledge and a second front ledge that extend along the front wall and are separated from each other in a front wall extension direction in which the front wall extends, and
the leading edge of the vane body is located between the first front ledge and the second front ledge in the front wall extension direction.

12. The vane according to claim 5, comprising a suction-side wall that is a part of the peripheral wall and provided along the suction-side end surface of the plate main body, wherein
the ledge includes a first suction-side ledge and a second suction-side ledge that extend along the suction-side wall and are separated from each other in a suction-side wall extension direction in which the suction-side wall extends, and
a part of the suction-side surface of the vane body that is closest to the suction-side end surface of the plate main body is located between the first suction-side ledge and the second suction-side ledge in the suction-side wall extension direction.

13. The vane according to claim 10, comprising a suction-side wall that is a part of the peripheral wall and provided along the suction-side end surface of the plate main body, wherein
the ledge includes a first suction-side ledge and a second suction-side ledge that extend along the suction-side wall and are separated from each other in a suction-side wall extension direction in which the suction-side wall extends, and
a part of the suction-side surface of the vane body that is closest to the suction-side end surface of the plate main body is located between the first suction-side ledge and the second suction-side ledge in the suction-side wall extension direction.

14. The vane according to claim 11, comprising a suction-side wall that is a part of the peripheral wall and provided along the suction-side end surface of the plate main body, wherein
the ledge includes a first suction-side ledge and a second suction-side ledge that extend along the suction-side wall and are separated from each other in a suction-side wall extension direction in which the suction-side wall extends, and
a part of the suction-side surface of the vane body that is closest to the suction-side end surface of the plate main body is located between the first suction-side ledge and the second suction-side ledge in the suction-side wall extension direction.

15. A gas turbine comprising:
the flow passage forming member assembly according to claim 9; and
a combustor that generates the combustion gas by combusting fuel.

16. A manufacturing method of a flow passage forming plate that defines a part of a gas flow passage through which combustion gas flows in a gas turbine, the manufacturing method comprising:
an intermediate product forming step of forming an intermediate product of the flow passage forming plate by casting; and
a part removing step of removing a part of the intermediate product, wherein
the intermediate product created in the intermediate product forming step has:
a plate main body having a gas path surface that faces a side of the gas flow passage, and an inner surface that faces the opposite side from the gas path surface;
a peripheral wall that is provided along a peripheral edge of the plate main body, and protrudes, relative to the inner surface, toward an opposite-flow-passage side that is a side of the inner surface based on the gas path surface; and
a ledge that protrudes along an inner wall surface of the peripheral wall, from the inner surface toward the opposite-flow-passage side, and receives an impingement plate having a plurality of through-holes, and
in the part removing step, a part of the ledge in a wall extension direction in which the peripheral wall extends is removed.

17. The manufacturing method of a flow passage forming plate according to claim 16, wherein, in the part removing step, a part of the plate main body on the side of the inner surface is removed so as to reduce an interval between the gas path surface and the inner surface of the plate main body.

18. A modification method of a flow passage forming plate that defines a part of a gas flow passage through which combustion gas flows in a gas turbine,
the flow passage forming plate to be modified having:
a plate main body having a gas path surface that faces a side of the gas flow passage, and an inner surface that faces the opposite side from the gas path surface;
a peripheral wall that is provided along a peripheral edge of the plate main body, and protrudes, relative to the inner surface, toward an opposite-flow-passage side that is a side of the inner surface based on the gas path surface; and
a ledge that protrudes along an inner wall surface of the peripheral wall, from the inner surface toward the opposite-flow-passage side, and receives an impingement plate having a plurality of through-holes,
the modification method comprising a part removing step of removing a part of the ledge in a wall extension direction in which the peripheral wall extends.

19. The modification method of a flow passage forming plate according to claim 18, wherein, in the part removing step, a part of the plate main body on the side of the inner surface is removed so as to reduce an interval between the gas path surface and the inner surface of the plate main body.

* * * * *